(12) United States Patent
Rodger et al.

(10) Patent No.: US 7,388,937 B1
(45) Date of Patent: Jun. 17, 2008

(54) SYSTEMS AND METHODS FOR JITTER ANALYSIS OF DIGITAL SIGNALS

(75) Inventors: Kevin L. Rodger, Vancouver (CA); Kenneth W. Ferguson, Burnaby (CA); Kevin Chun Yeung Hung, Vancouver (CA); Jeremy Paul James Benson, Port Moody (CA); Andrew S. Wright, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 710 days.

(21) Appl. No.: 10/923,988

(22) Filed: Aug. 23, 2004

Related U.S. Application Data

(62) Division of application No. 10/830,482, filed on Apr. 21, 2004.

(60) Provisional application No. 60/464,442, filed on Apr. 21, 2003.

(51) Int. Cl.
*H03D 1/06* (2006.01)

(52) U.S. Cl. .................................. 375/348; 375/346

(58) Field of Classification Search ................ 375/348, 375/346, 286, 226, 228, 229, 227, 285, 371; 702/69; 370/516; 455/296
See application file for complete search history.

(56) References Cited

U.S. PATENT DOCUMENTS

| | | | |
|---|---|---|---|
| 6,185,509 B1 | 2/2001 | Wilstrup et al. | |
| 6,298,315 B1 | 10/2001 | Li et al. | |
| 6,356,850 B1 | 3/2002 | Wilstrup et al. | |
| 6,449,570 B1 | 9/2002 | Wilstrup et al. | |
| 6,553,087 B1 * | 4/2003 | Alelyunas et al. | 375/357 |
| 6,741,641 B1 | 5/2004 | Ballantyne et al. | |
| 6,898,535 B2 | 5/2005 | Draving | |
| 7,167,516 B1 * | 1/2007 | He | 375/232 |
| 2002/0120420 A1 * | 8/2002 | Wilstrup et al. | 702/108 |
| 2003/0004664 A1 | 1/2003 | Ward et al. | |
| 2003/0076181 A1 * | 4/2003 | Tabatabaei et al. | 331/57 |
| 2004/0062301 A1 | 4/2004 | Yamaguchi et al. | |
| 2004/0136450 A1 * | 7/2004 | Guenther | 375/226 |
| 2004/0136479 A1 * | 7/2004 | Miller | 375/348 |

OTHER PUBLICATIONS

Cosart, Lee D. and Luiz Peregrino, *Time Domain Analysis and Its Practical Application to the Measurement of Phase Noise and Jitter*, IEEE Transactions on Instrumentation and Measurement, vol. 46, No. 4, Aug. 1997, pp. 1016-1019.

(Continued)

*Primary Examiner*—Chieh M. Fan
*Assistant Examiner*—Aristocratis Fotakis
(74) *Attorney, Agent, or Firm*—Knobbe Martens Olson & Bear LLP

(57) ABSTRACT

Systems and methods for analyzing the jitter content of an oversampled digital communication signal are disclosed. Advantageously, the communication signal can correspond to an arbitrary data sequence, rather than only to a repeating test sequence. For example, the systems and methods can be embodied in test equipment and in simulation equipment as design tools and/or validation tools. The systems and methods disclosed advantageously facilitate the decomposition and quantification of the main jitter components (random and deterministic), as well as its various subcomponents (periodic jitter, data-dependent jitter, inter-symbol interference, device-state-dependent jitter, other bounded uncorrelated jitter, and data-dependent-random jitter).

9 Claims, 21 Drawing Sheets

OTHER PUBLICATIONS

Damm, Wendell, *Oscilloscope Connectivity Made Easy*, Tektronix, Inc., (Beaverton 2000), Ch. 5, pp. 113-138.

Handel, Peter, *Properties of the IEEE-Std-1057 Four-Parameter Sine Wave Fit Algorithm*, IEEE Transactions on Instrumentation and Measurement, vol. 49, No. 6, Dec. 2000, pp. 1189-1193.

IEEE Standard For Digitizing Waveform Recorders, IEEE Std. 1057, 1994.

USPTO; Office Action dated May 17, 2007, from related application U.S. Appl. No. 10/830,482, filed Apr. 21, 2004.

USPTO; Office Action dated Oct. 31, 2007, from related application U.S. Appl. No. 10/924,026 filed Aug. 23, 2004.

USPTO; Office Action dated Oct. 31, 2007, from related application U.S. Appl. No. 10/923,997 filed Aug. 23, 2004.

\* cited by examiner

* with non-numeric place-holders where no edge transition occurs (a) N-Tuple Identifiers for N=5

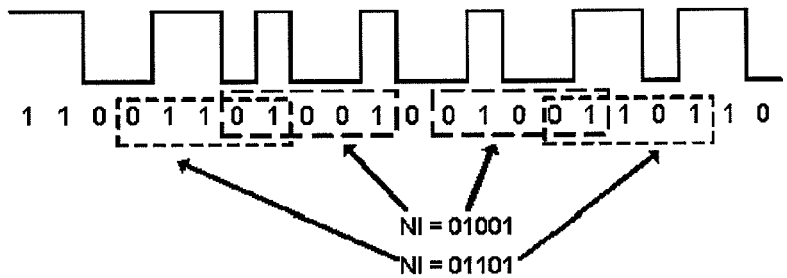

(b) Nominal TIE Distribution

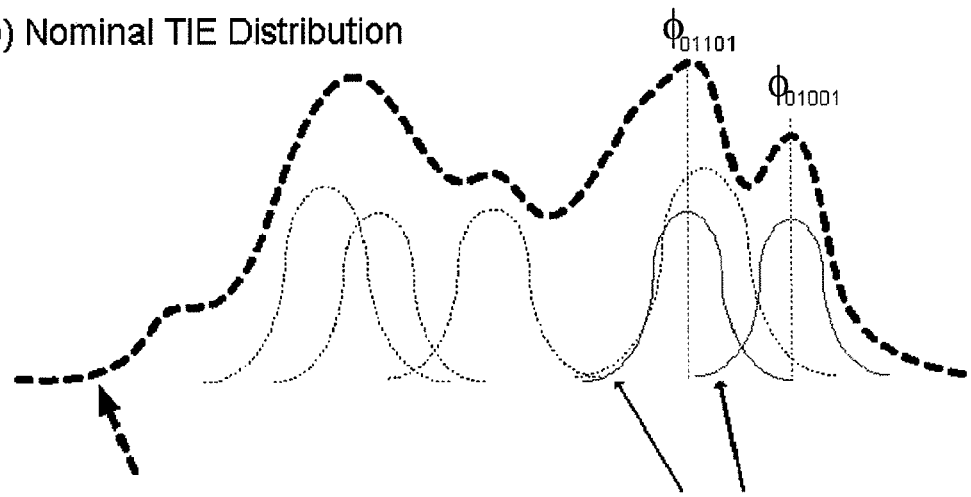

Complicated total TIE histogram is sum of many individual histograms with different offsets.

Histogram for each unique NI contains RJ and PJ and is therefore symmetrical.

(c) DDJ-Corrected TIE Distribution

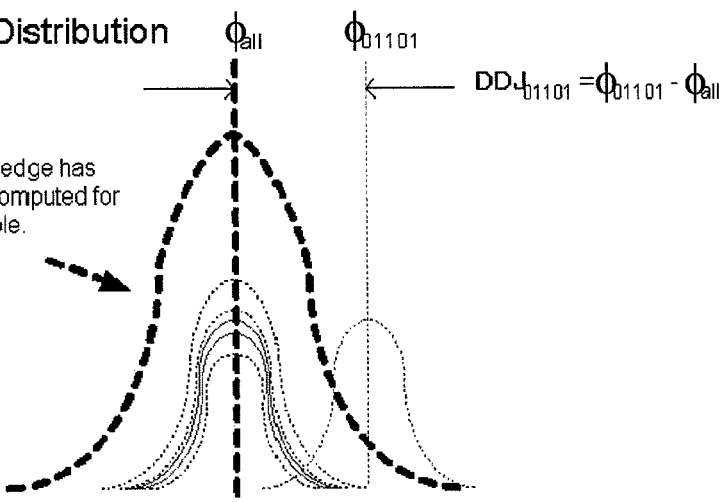

Resultant histogram after each edge has been corrected to remove DDJ computed for that edge's unique N-tuple.

FIGURE 14

SYSTEMS AND METHODS FOR JITTER ANALYSIS OF DIGITAL SIGNALS

RELATED APPLICATIONS

This application is a divisional application of U.S. application Ser. No. 10/830,482, filed Apr. 21, 2004, which claims the benefit under 35 U.S.C. § 119(e) of U.S. Provisional Application No. 60/464,442, filed Apr. 21, 2003, the entireties of which are hereby incorporated by reference.

This application is also related to copending U.S. application Ser. No. 10/924,026, filed on the same date as the present application, and to copending U.S. application Ser. No. 10/923,997, filed on the same date as the present application, both of which are divisional applications of U.S. application Ser. No. 10/830,482, filed Apr. 21, 2004.

BACKGROUND OF THE INVENTION

1. Field of the Invention

The invention generally relates to measurement systems. In particular, the invention relates to measurement systems for analyzing jitter.

2. Description of the Related Art

Jitter in a digital communication signal is the variation in time of data (or clock) edges from integer multiples of the bit period unit interval (UI) time. In an ideal signal, the edges would occur at exact interval times. In a real signal there is variation in the edge locations due to various phenomena in the signal generation and transmission system. FIG. 1 shows a representation of a digital data signal labeled jittered data 102 relative to a reference clock 104. In the illustrated example, the jittered data 102 is capable of changing states approximately at times corresponding to the rising edges of the reference clock 104. This data signal has variation in the edge locations. The variation is plotted relative to the ideal location, at the bottom of FIG. 1. This variation is known as the jitter 106, or time interval error (TIE), of the signal. It will be understood that whether there is an actual transition in the jittered data 102 corresponding to an edge of the reference clock 104 will depend on the data itself. For example, the data can remain at a "one" or a "zero" state for multiple clock periods.

Many current industry specifications divide jitter into two main categories: unbounded random jitter (RJ), and bounded deterministic jitter (DJ). Random jitter (RJ) is modeled as having a zero-mean Gaussian distribution and is quantified by the standard deviation. Deterministic jitter (DJ) is parameterized as a peak-to-peak value. The total jitter (TJ) is also parameterized as a peak-to-peak value, which is a combination of deterministic jitter (DJ) and random jitter (RJ). Given that the total jitter (TJ) is unbounded on account of the random jitter (RJ) contribution, it is specified as the peak-to-peak time interval between which all but a fraction of the jitter population falls. A fraction commonly specified is $10^{-12}$, but it will be understood by one of ordinary skill in the art that the specified fraction can vary in a very broad range and can include larger fractions and smaller fractions. For example, some emerging applications specify fractions that are orders of magnitude smaller than $10^{-12}$. A relatively direct method of measuring the total jitter (TJ) under this stipulation is to measure the jitter for $10^{14}$ bits in order to obtain reliable statistical information on the total jitter (TJ) range that occurs with a $1\text{-}10^{-12}$ probability. However, this would be relatively time consuming, taking over 27 hours if $10^{14}$ consecutive bits at 1 Gbit/s were to be observed. A more feasible method is to observe the jitter for a shorter period, and estimate the $10^{-12}$ peak-to-peak jitter by fitting its distribution to a statistical model.

A simplified jitter model is illustrated in FIG. 2 with periodic jitter (PJ) represented by a dual-Dirac, random jitter (RJ) represented by a Gaussian in an upper trace 202. The resulting convolution of both is shown in a lower trace 204. It should be noted that the dual-Dirac has been scaled for visibility in the plot of FIG. 2. The model typically used to represent the distribution of the jitter components is a zero mean Gaussian for random jitter (RJ), and a dual-Dirac function for deterministic jitter (DJ) (the dual-Dirac function being an approximation to the distribution of a sinusoid). In this case, the total jitter is simply two Gaussian distributions with means offset equal to the offsets in the Dirac functions (see FIG. 2). For this distribution, the approximate calculation of all but $10^{-12}$ of the population is given as the sum of the peak-to-peak of the deterministic jitter and 14 times the standard deviation, or RMS value, of the random jitter (see Equation 1 below).

$$TJ_{pp}(10^{-12}) = RJ_{pp}(10^{-12}) + DJ_{pp} \approx 14 RJ_{rms} + DJ_{pp} \quad \text{Equation 1}$$

Some instruments and specifications define $TJ_{pp}$ explicitly according to Equation 1. Others generate a histogram distribution for total jitter (TJ) based on the convolution of the calculated random jitter (RJ) and deterministic jitter (DJ) distributions. The $TJ_{pp}$ is then extrapolated for the specified population by fitting the total jitter (TJ) distribution to a bathtub curve model. In each case however, there is a common underlying problem:

1. The jitter content of a signal will typically be demodulated from the signal itself.
2. The random jitter (RJ) and deterministic jitter (DJ) components will typically be decomposed from the measured jitter and quantified.
3. The $TJ_{pp}$ will typically then be calculated based on the combination of random jitter (RJ) and deterministic jitter (DJ) for the specified population.

FIG. 3 is a tree diagram that illustrates selected components of jitter. Jitter at each level of the hierarchy in the tree diagram is not necessarily independent, for example, duty cycle distortion (DCD) jitter 316 may be due to inter-symbol interference (ISI) jitter 314. Deterministic jitter (DJ) 306 is commonly subdivided further into the following components: periodic jitter (PJ) 308, data-dependent jitter (DDJ) 310, and bounded uncorrelated jitter (BUJ) 312, with data-dependent jitter (DDJ) 310 further subclassified as linear inter-symbol interference (ISI) jitter 314 and duty cycle distortion (DCD) jitter 316.

Periodic jitter (PJ) 308 includes tones that are uncorrelated with the data. Data-dependent jitter (DDJ) 310 is correlated to the data pattern where: inter-symbol interference (ISI) jitter 314 is due to band-limiting in the system, and duty cycle distortion (DCD) jitter 316 is related to a mismatch between the falling and rising edges of the signal due to the signal transmitter. Bounded uncorrelated jitter (BUJ) 312 is the grouping of other effects that are bounded but are not correlated to the data pattern, and do not exhibit a periodic behavior. One possible source of bounded uncorrelated jitter (BUJ) 312 is cross-talk from asynchronous aggressors. Although most current specifications only state limitations on random jitter (RJ) 304, deterministic jitter (DJ) 306, and total jitter (TJ) 302, the subcomponents of deterministic jitter (DJ) 306 are often of interest for device analysis.

Conventional Jitter Analysis

There are several standard methods in the industry to deal with the problem of jitter decomposition. They are based on either a method of undersampling the data, typically with the use of a time interval analyzer, or oversampling the data with a single-shot sampling oscilloscope. After the jitter data has been recovered from the captured data, it is typically separated using one of two methods. The first method involves the construction of a histogram of the jitter in the time domain. This histogram is divided into its random and deterministic parts through an analysis of its shape. The second method involves the transformation of the jitter into the frequency domain using a Fourier Transform (FT), such as a Fast Fourier Transform (FFT). Once in the frequency domain, it is stated that the deterministic components may be identified as tones in jitter spectrum, while the random components make up the noise floor of the spectrum. The spectrum is then separated into two parts and the random jitter (RJ) 304 is calculated from the noise floor, and the deterministic jitter (DJ) 306 is calculated from the tones.

While these existing methods may be applied successfully to make jitter approximations in specific cases, there are many situations in which these methods fail.

General Undersampling Methods

FIG. 4 illustrates a sampled waveform and its corresponding time interval error (TIE). Some industry standard methods are based on the use of undersampled data. See, for example: U.S. Pat. Nos. 6,185,509; 6,356,850; and 6,449,570. These methods can use either an undersampling time interval analyzer or an undersampling oscilloscope. The methods were typically developed in this way due to hardware limitations that would not allow for every contiguous edge to be measured. One problem with such methods is that sporadic events that are not correlated with the data and do not occur regularly can be completely overlooked. FIG. 4 shows the jitter data for a signal where this is the case. When measured using an undersampling time interval analysis method, this signal yields a total jitter value of less than 0.25 UI (well within specifications), even though this signal causes a failure in the receiver. Using an oversampling method reveals that the total jitter is actually greater than 0.5 UI.

Time Interval Analyzer Span Measurements to Acquire Jitter Data and to Determine Data Dependent Jitter Component The method of time interval analyzer span measurements is implemented to calculate the data-dependent jitter (DDJ) component of jitter in a signal. See for example: U.S. Pat. Nos. 6,185,509; 6,356,850; and 6,449,570. Collections of time interval measurements are gathered for every edge in a repeating data sequence. These collections are processed to generate a histogram distribution of jitter for each edge independently. The mean offset of each histogram represents the data-dependent jitter (DDJ) associated with the edge in question. The difference between the maximum and minimum mean offsets is the peak-to-peak data-dependent jitter (DDJ). This method is dependent on a priori knowledge of the repeating data pattern and will fail if the pattern is not repeating or if the pattern is unknown.

Time-Domain Histogram Tail-Fitting Method

The tail-fitting method is based on the generation of a histogram of the jitter data. See, for example, U.S. Pat. No. 6,298,315. It has been suggested by conventional techniques that fitting Gaussian curves to the tail portions of the distribution can identify the random jitter (RJ) content. The RMS value of the random jitter (RJ) is then calculated as average value of the standard deviation of the two Gaussian curves, and the peak-to-peak deterministic jitter (DJ) is calculated as the separation between the means of the two Gaussian curves.

In reference to the dual-Dirac and Gaussian model described earlier in connection with FIG. 2, this suggested solution is a relatively accurate approximation. The convolution of the dual-Dirac with the Gaussian has a negligible effect on the shape of the tails. It should be noted that the shape of the tail corresponds to the sum of the Gaussian with its shifted duplicate. Due to the rapidly decaying nature of the Gaussian curve, if there is significant separation between the two Gaussian distributions, then the value of the tail portion of one will be insignificant at the tail location of the other as illustrated in FIG. 2. However, if the dual-Dirac distribution model is replaced with one representing an actual tone, or multiple tones for deterministic jitter (DJ), the suggested solution is relatively inaccurate. In generating the total jitter (TJ) distribution, by convolving the Gaussian and the new deterministic jitter (DJ) distribution, the shape of the resulting tail region will be significantly altered from the original Gaussian. The parameters estimated from this data set will be biased due to model mismatch.

Frequency-Domain Spectral Separation Method

The spectral separation method is based on oversampled data acquired using a single-shot sampling oscilloscope. See, for example, U.S. Patent Application Publication US2003/0004664. The threshold crossings for each consecutive edge are interpolated between the sample points, and the jitter data is derived. The jitter data is transformed into the frequency domain using a Fourier Transform (FT). It is claimed that the deterministic jitter (DJ) components can be distinguished from the random jitter (RJ) as peaks in the spectrum. Although this may be accurate for a simple case where the deterministic jitter (DJ) is composed of a single periodic jitter (PJ) tone, or a very small amount of data-dependent jitter (DDJ), this method will fail in the presence of multiple periodic jitter (PJ) tones, periodic jitter (PJ) tones of relatively large amplitudes, or a significant amount of data-dependent jitter (DDJ). Due to the windowing effects of the Fourier Transform (FT), a certain amount of power from any tones in the spectrum will be distributed into side lobes of the tone. When the major lobe, or peak, of the tone is removed from the spectrum, the side lobes will remain and inappropriately contribute to the random component of the jitter. In cases where the side lobes are relatively few and relatively small, then this will not matter. However, in cases where there are relatively many sidelobes, or they are relatively large, then the random component can be dramatically inflated. Examples of this are described.

In a first example, in cases where there is a relatively large tone in the spectrum whose frequency does not fall precisely on a bin center, the side lobes may become significant. This occurs in jitter tolerance testing when signals with relatively large amounts of periodic jitter (PJ) are artificially created to stress device receivers.

In a second example, in cases where there are relatively many tones in the spectrum, the sum of all the resultant side lobes becomes significant. This occurs commonly with data-dependent jitter (DDJ), when the high frequency content of the signal is approaching the bandwidth of the transmission channel. Jitter tones due to data-dependent jitter (DDJ) occur throughout the spectrum at multiples related to the bit pattern length. A relatively large amount of data-dependent jitter (DDJ) can be intentionally introduced in jitter tolerance measurements to stress device receivers.

Relatively large amounts of data-dependent jitter (DDJ) are also common in system intrinsic jitter measurements where signals are measured after long transmission channels such as back-planes and multiple connectors.

FIG. 5 illustrates an example of time interval error (TIE) associated with data-dependent jitter (DDJ). The frequency domain spectral separation method is dependent on a repeating data pattern so that data-dependent jitter (DDJ) shows up as tones in the jitter spectrum. In the case of random data, data-dependent jitter (DDJ) does not show as tones in the spectrum. Rather, it is broadband and cannot be distinguished from the noise floor. Therefore, this method fails in the presence of random data. FIG. 5 depicts a simulated random data signal containing only data-dependent jitter (DDJ) (no random jitter (RJ) or periodic jitter (PJ)), the TIE signal, and the power spectrum of the TIE signal.

Further Jitter Component Analysis

FIG. 6 illustrates an example of further components of jitter that can advantageously be distinguished using the techniques disclosed herein. It will be shown that by doing this a more accurate calculation of the total jitter (TJ) 302 can be performed, and a better analysis can advantageously be performed on the jitter content to aid in the identification of sources of jitter in the signal. FIG. 6 illustrates selected additional jitter categories that can be recognized using the techniques disclosed herein versus the limited categories previously described in connection with FIG. 3.

Data-Dependent Random Jitter (DDRJ) 602

Random jitter (RJ) 304 may be further categorized as data-dependent random jitter (DDRJ) 602. In certain cases, the random jitter (RJ) 304 standard deviation is dependent on the data surrounding any given transition. This phenomenon has been observed in data where the slew rate of each edge is also data dependent. It is most evident in situations where signals are intentionally degraded for jitter tolerance testing, and random jitter (RJ) 304 is imposed on the signal through the addition of amplitude noise. The transformation of amplitude noise into random jitter (RJ) 304 is a linear function of the slew rate.

Conventional jitter decomposition methods disadvantageously assume an equal distribution for random jitter (RJ) 304 across all edges in the signal, and calculate random jitter (RJ) 304, and subsequently total jitter (TJ) 302, based on this assumption. This can result in an underestimation of the critical peak-to-peak random jitter (RJ) contribution. Advantageously, disclosed techniques include a method to account for these effects in the $RJ_{pp}$ and $TJ_{pp}$ computations.

Device State Dependent Jitter (DSDJ) 604

Data generation and transmission systems are subject to performance variations depending on the pattern content of the data, and other factors within the system that relate to the data. For example, the transmission of data with a high transition density, e.g., 01010101, can consume relatively more power than data with a low transition density, e.g., 00001111. Power fluctuations and other phenomena can dramatically affect the jitter content of the signal, contributing to device state dependent jitter (DSDJ) 604. Analyzing device state dependent jitter (DSDJ) 604 can be useful in identifying problems in a system. Existing jitter decomposition methods lump device state dependent jitter (DSDJ) 604 and inter-symbol interference (ISI) jitter 314 together, whereas disclosed techniques advantageously permit them to be distinguished from one another.

Current state of the art jitter analysis and decomposition is represented by the following public domain publications, the disclosures of which are incorporated herein by reference in their entirety:

U.S. Pat. No. 6,298,315: Method and Apparatus for Analyzing Measurements

U.S. Pat. No. 6,298,315 to Li, et al describes a method of analyzing data to separate it into random and deterministic components. The method generates a time-domain histogram of the data and identifies the tail segments of that histogram. A Gaussian curve is fitted to each of the tails. The Gaussian curves are associated with the random component and the remainder of the distribution is associated with deterministic component.

U.S. Pat. No. 6,356,850: Method and Apparatus for Jitter Analysis

U.S. Pat. No. 6,356,850 to Wilstrup, et al., describes a method and apparatus for separating the components of a jitter signal. It identifies a reference edge in a repeating data signal and makes multiple time span measurements between that reference edge and the other edges in the data signal. The variation in these time span measurements is a representation of the jitter in the signal. It generates variation estimates of the time spans, calculates the autocorrelation function of the jitter signal, and transforms the autocorrelation function into the frequency domain using a Fourier Transform (FT). The random and deterministic components are separated in the frequency domain using a Constant False Alarm Rate (CFAR) filter, where the peaks of the frequency spectrum are associated with the deterministic components. This technique is limited to the analysis of periodic waveforms, such as repetitive digital bit sequences.

U.S. Pat. No. 6,185,509 and U.S. Pat. No. 6,449,570: Analysis of Noise in Repetitive Waveforms U.S. Pat. No. 6,185,509 to Wilstrup, et al., and U.S. Pat. No. 6,449,570 also to Wilstrup, et al., describe a method for measuring time intervals in a repeating pattern, and characterizing the variation in those time intervals. It is directly applied to measuring the jitter in a repeating pattern.

US2003/0004664: Apparatus and Method for Spectrum Analysis-Based Serial Data Jitter Measurement U.S. Patent Application Publication No. US2003/0004664 by Ward, et al., describes an apparatus and method of jitter separation for repeating patterns. It is based on spectral analysis of the jitter signal to separate deterministic jitter and random jitter. The jitter signal is transformed into the frequency domain using a Fourier Transform (FT). The CFAR filter using a single sliding window is employed to separate the deterministic jitter (DJ) components from the random jitter (RJ) component. The data-dependent components (DDJ), periodic jitter components (PJ), and duty cycle distortion (DCD) components are separated by analyzing the spectrum of the components identified as deterministic jitter (DJ).

SUMMARY OF THE INVENTION

This disclosure describes a process for analyzing the jitter content of an oversampled digital communication signal, which may be an arbitrary data sequence. As used herein, the term oversampled is used with respect to the symbol rate of the communication signal. The process samples the waveform at a rate that is sufficiently higher than the symbol rate in order to accurately identify the threshold crossing locations. Oversampling, as used herein, does not relate to the bandwidth of the analog waveform relative to the Nyquist bandwidth. This process facilitates the decomposition and quantification of the main jitter components (random and deterministic), as well as its various subcomponents (periodic jitter, data-dependent jitter, inter-symbol interference, device-state-dependent jitter, other bounded uncorrelated jitter, and data-dependent-random jitter).

Many current specifications for high-speed digital communications require that the jitter content in a signal be broken down into its random and deterministic parts, and quantified. With conventional methods and apparatus, the algorithms used to do this are based strictly on the use of repeating data patterns, and are applied based on a simplified model of jitter. Such a model fails to represent the complicated jitter structures that are found in real-life systems. The method proposed is designed to effectively process arbitrary data sequences and complicated jitter structures.

The disclosed techniques can advantageously be applied to oversampled signal data that has been exported from a continuous sampling instrument such as a single-shot sampling oscilloscope. It can also be applied to data generated from a simulation environment. The proposed method can be implemented in software, in hardware or a combination of the two. Advantageously, the disclosed techniques are suitable for near-real-time analysis.

Embodiments are also applicable, but not limited, to the measurement of jitter, a phase modulation, a frequency modulation, or an amplitude modulation, where a threshold between two or more states can be identified, and the modulation of the occurrence of that threshold relative to an ideal occurrence is the parameter to be measured.

Embodiments are also applicable, but not limited, to the analysis of a digital communications signal where the number of like symbols occurring adjacent to one another must be determined in cases where there is no identifiable state transition occurring to signify the number of adjacent symbols.

Embodiments are also applicable, but not limited, to the analysis of the modulating signal behavior in digital communication signals, where the modulating signal behavior displays a correlation to the data content of the signal.

Embodiments are also applicable, but not limited, to the measurement of any signal where it is desired to decompose the content of that signal into parts including, but not limited to, random parts, deterministic parts, periodic parts, data correlated parts, linear interference parts, and non-linear interference parts.

One embodiment is a method of reconstructing a reference clock from a data signal under test, where a logical state of the data signal can change at a symbol rate, where the method includes: receiving cumulative timestamps corresponding to when data has actually transitioned in the data signal under test and indications of one of a rising edge and a falling edge of the data signal corresponding to the actual transitions; receiving at least one of an indication for the symbol rate or for a symbol period such that at least an approximate symbol period is known; using the symbol period and an elapsed time between actual data transitions to count a number of symbol periods that elapse between actual data transitions; and selecting a fixed reference clock symbol period for a reference clock, where the fixed reference clock symbol period is selected based at least in part on a comparison between the actual transitions and the transitions of the reference clock.

One embodiment is a method of counting consecutive symbol periods with the same symbol in a data signal under test, where a logical state of the data signal can change at a symbol rate, where the method includes: receiving at least one of an indication of the symbol rate and a symbol period such that at least an approximate estimate of the symbol period is known; receiving indications corresponding to when data has transitioned in the data signal under test and indications of at least one of a rising edge and a falling edge of the data signal corresponding to the transitions; and using the estimate of the symbol period and an elapsed time between data transitions to count a number of symbol periods that elapse between data transitions to maintain alignment of actual transitions in the data signal with a generated reference clock that is phase-locked to the symbol rate.

One embodiment is a method of reconstructing a reference clock signal from a data signal, where a logical state of the data signal can change at a symbol rate, where the method includes: receiving indications of when a data transition has occurred in the data signal; receiving counts of symbol cycles between data transitions; and selecting a clock period for the reference clock, where the clock period is selected based at least in part on a comparison between the data transitions of the data signal and transitions of the reference clock, where the counts of symbol cycles are used in the comparison to align corresponding data transitions of the data signal and transitions of the reference clock.

One embodiment is a method of analyzing jitter, where the method includes: receiving a data signal; extracting a reference clock signal from the data signal; and using data crossings in the data signal and clock edges of the reference clock signal to generate a time interval error signal representing jitter.

One embodiment is a method of analyzing jitter in a observed data signal, where the jitter includes inter-symbol interference (ISI) from linear distortion, where the method includes: receiving a data sequence corresponding to the observed data signal; generating a reference data signal from the data sequence; receiving the observed data signal; non-linearly interpolating the observed data signal so that a sampling rate for the non-linearly interpolated observed data signal and a sampling rate for the reference signal match; comparing the reference data signal to the non-linearly interpolated observed data signal to generate a model of the linear distortion, where the model includes filter coefficients; providing the filter coefficients of the model to a digital filter; and processing the reference observed data signal using the filter coefficients of the model to generate a data signal with inter-symbol interference (ISI) jitter.

One embodiment includes a method of identifying a data dependent jitter from a composite of jitter, where the method includes: receiving a time interval error (TIE) data series corresponding to the composite of jitter in an observed data signal; receiving a data sequence corresponding to the observed data signal; selecting N-tuple Identifiers (NI) corresponding to data patterns; identifiably collecting jitter values in the time interval error (TIE) data series according to the selected N-tuple Identifiers (NI); and averaging the identifiably collected jitter values to compute an average phase offset for the jitter values for the selected N-tuple Identifiers (NI), where the average phase offset of an N-tuple Identifier is associated with a data-dependent jitter value for the data pattern corresponding to the N-tuple Identifier.

One embodiment includes a method of decomposing a first time interval error (TIE) signal of an observed signal, where the method includes: receiving the first time interval error (TIE) data series corresponding to the composite of jitter in the observed data signal; associating edges in the observed data signal with N-tuple Identifiers (NI) corresponding to data patterns; associating jitter in the first time interval error (TEE) data series with corresponding N-tuple Identifiers (NI); generating a second time interval error (TIE) data series corresponding to data-dependent jitter (DDJ) from the jitter associated with N-tuple Identifiers (NI); and subtracting the second time interval error (TIE) data series from the first time interval error (TIE) data series to generate a third time interval error (TIE) data series corresponding to the first time interval error (TIE) data series with data-dependent jitter (DDJ) removed.

One embodiment includes a method of identifying a data dependent jitter from a composite of jitter, where the method includes: receiving a time interval error (TIE) data series corresponding to the composite of jitter in an observed data signal, where the observed data signal corresponds to a repeating data pattern; automatically recognizing a length of the data pattern; collecting jitter values for transitions according to the length of the data pattern in the time interval error (TIE) data series; and averaging the identifiably collected jitter values to compute a data-dependent jitter value for the data pattern.

One embodiment includes a method of decomposing device state dependent jitter (DSDJ) from an observed data signal, where the method includes: receiving a first decomposed signal for the observed data signal, where the first decomposed signal comprises data dependent jitter (DDJ); receiving a second decomposed signal for the observed data signal, where the second decomposed signal comprises inter-symbol interference (ISI) jitter; and subtracting samples of the second decomposed signal from corresponding samples of the first decomposed signal to decompose the device state dependent jitter (DSDJ) signal.

One embodiment includes a method of computing peak-to-peak random jitter (RJPP), where the method includes: receiving a composite time interval error (TIE) signal that includes two or more separate distributions of random jitter; identifying separate distributions of random jitter; computing probability values ($p_i$-values) for the identified separate distributions; initializing a value for random jitter peak to peak to a first predetermined value; computing actual probability values ($p_{act}$-values) for the identified separate distributions; and adding a step size ($\mu$) when an actual probability value exceeds a second predetermined value.

One embodiment includes a method of identifying periodic jitter (PJ) components from a composite of jitter, where the method includes: receiving a first data series corresponding to the composite of jitter; computing a spectral power density to identify regions in a frequency spectrum of the composite of jitter corresponding to peaks and to aprons of the peaks; generating at least one of a first spectrum and a second spectrum: where the first spectrum corresponds to periodic jitter (PJ), where generating the first spectrum includes using bins corresponding to the identified regions in the composite of jitter, and where other bins in the first spectrum are set to a low value; where the second spectrum corresponds to periodic jitter (PJ), where generating the second spectrum includes setting bins corresponding to the identified regions to a low value, and where other bins in the second spectrum include computed bins from the composite of jitter; and performing an inverse Fourier transform (IFT) of at least one of the first spectrum and the second spectrum, where the IFT of the first spectrum corresponds to a periodic jitter (PJ) time interval error series and where the IFT of the second spectrum corresponds to a random jitter (RJ)/bounded uncorrelated jitter (BUJ) time interval error series.

One embodiment includes a method of identifying periodic jitter (PJ) components from a composite of jitter, the method includes: receiving a first data series corresponding to the composite of jitter; computing spectral power density to identify regions in a frequency spectrum of the composite of jitter corresponding to peaks and to aprons of the peaks, where the identified regions correspond to periodic jitter (PJ); using the identified regions to determine coefficients for a time-domain filter, where the time-domain filter is configured to filter out the periodic jitter (PJ); and applying the time domain filter to the first data series corresponding to the composite of jitter to generate a second data series, where the second data series corresponds to a signal with random jitter (RJ) and bounded uncorrelated jitter (BUJ).

One embodiment is a method of identifying periodic jitter (PJ) components from a composite of jitter, where the method includes: receiving a first data series corresponding to the composite of jitter; computing a power spectral density of the composite of jitter; searching the power spectral density to coarsely detect a frequency and bandwidth for one or more tones; detecting a fine center frequency and bandwidth for the one or more tones detected corresponding to the detection of the coarse frequency and bandwidth; estimating an amplitude and a phase for the one or more detected tones; and synthesizing a periodic jitter (PJ) signal from the estimated amplitude and phase for the one or more detected tones.

In addition, embodiments include computer programs, such as firmware and/or software, embodiment in a tangible medium, such as a hard disk, optical disk, semiconductor memory, and the like. Also, embodiments include hardware circuits, such as integrated circuits, which can include field-programmable gate arrays (FPGAs) and/or application specific integrated circuits (ASICs).

For example, one embodiment includes a computer program embodied in a tangible medium for reconstructing a reference clock from a data signal under test, where a logical state of the data signal can change at a symbol rate, where the computer program includes: a module configured to receive cumulative timestamps corresponding to when data has actually transitioned in the data signal under test and indications of one of a rising edge and a falling edge of the data signal corresponding to the actual transitions; a module configured to receive at least one of an indication for the symbol rate or for a symbol period such that at least an approximate symbol period is known; a module configured to use the symbol period and an elapsed time between actual data transitions to count a number of symbol periods that elapse between actual data transitions; and a module configured to select a fixed reference clock symbol period for a reference clock, where the fixed reference clock symbol period is selected based at least in part on a comparison between the actual transitions and the transitions of the reference clock.

For example, one embodiment is a circuit for reconstructing a reference clock from a data signal under test, where a logical state of the data signal can change at a symbol rate, where the circuit includes: a means for receiving cumulative timestamps corresponding to when data has actually transitioned in the data signal under test and indications of one of a rising edge and a falling edge of the data signal corresponding to the actual transitions; a means for receiving at least one of an indication for the symbol rate or for a symbol period such that at least an approximate symbol period is known; a means for using the symbol period and an elapsed time between actual data transitions to count a number of symbol periods that elapse between actual data transitions; and a means for selecting a fixed reference clock symbol period for a reference clock, where the fixed reference clock symbol period is selected based at least in part on a comparison between the actual transitions and the transitions of the reference clock.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 14 includes FIGS. 14(a), 14(b), and 14(c). FIG. 14(a) illustrates a process for identifying N-tuple Identifier (NI) values. FIG. 14(b) illustrates an example of a nominal TEE distribution of a complex histogram of the Filtered TIE series with the combined effects of the many jitter components. FIG. 14(c) illustrates a DDJ-corrected TIE distribution.

DETAILED DESCRIPTION OF PREFERRED EMBODIMENTS

Figure 6:
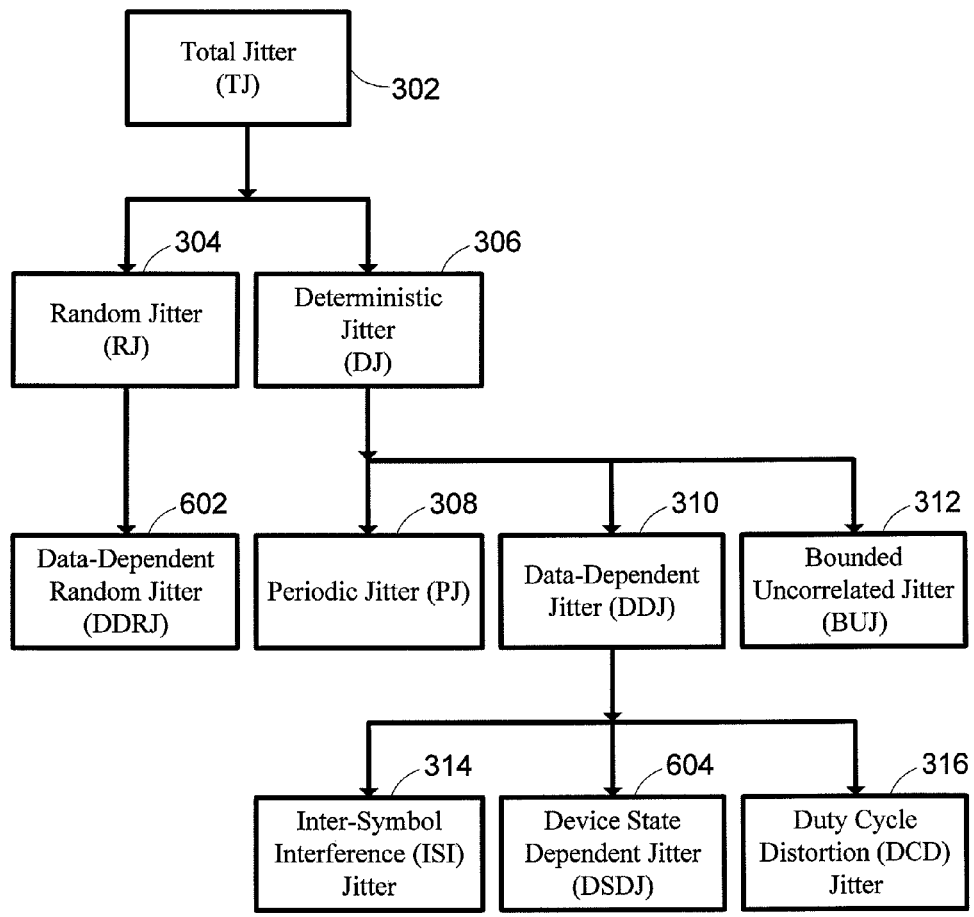
FIG. 6 illustrates an example of further components of jitter that can advantageously be distinguished using the techniques disclosed herein.

One measure of the timing quality of a digital communication signal is its jitter content. The jitter content can be analyzed and subdivided into a hierarchy of categories (see FIG. 6). The total jitter (TJ) includes random jitter (RJ) and deterministic jitter (DJ). The random jitter (RJ) is further divided into various distributions of data-dependent random jitter (DDRJ). The deterministic jitter (DJ) includes periodic jitter (PJ), data-dependent jitter (DDJ), and bounded uncorrelated jitter (BUJ), with data-dependent jitter (DDJ) further divided into inter-symbol interference (ISI), DSDJ, and duty cycle distortion (DCD).

Jitter measurements are often performed to determine whether or not a system meets jitter specifications (in real or simulated systems), to aid in the identification of possible root causes of jitter in a system, and the like. In testing whether a system meets jitter specifications, an accurate measurement of random jitter (RJ), deterministic jitter (DJ), and total jitter (TJ) is desirable. Existing methods often do not provide these accurate measurements in all of the necessary conditions.

For example, in contrast to the techniques described by Li in U.S. Pat. No. 6,298,315, one embodiment advantageously separates random from deterministic components: first by identifying data correlation to remove some of the deterministic components, and second by differentiating between random and deterministic components in the frequency domain. Unlike the method described in the above patent, one embodiment operates on contiguous samples of the TEE time series and exploits their positions in time to perform the decomposition.

In contrast to the techniques described in U.S. Pat. No. 6,356,850 to Wilstrup, et al., in one embodiment, a time stamp is generated for every contiguous edge in the data signal and an ideal reference time is calculated for every edge based on a best fit to the data. The difference between each edge time stamp and its ideal reference time advantageously provides the instantaneous jitter signal for the entire collected duration of the signal. The data dependent components of the jitter are separated by analyzing the jitter signal in the time domain. The remaining jitter signal is transformed into the frequency domain, where a modified version of the Constant False Alarm Rate filter is employed which uses a dual sliding window to identify the peaks and the bandwidth of each periodic jitter (PJ) component. Any of the well-known power spectral estimation techniques can be used, including the above-mentioned Fourier transform of the autocorrelation estimate. The techniques described in this disclosure are advantageously applicable to arbitrary waveforms and advantageously do not require periodic waveforms.

In contrast to the techniques disclosed by Wilstrup, et al., in U.S. Pat. No. 6,185,509, disclosed techniques, on the other hand, may advantageously be applied to arbitrary data sequences, and thus do not require a repeating pattern. However, it will be understood that the disclosed techniques remain compatible with repeating patterns.

In contrast to the techniques disclosed by Ward in U.S. Patent Application Publication No. US2003/0004664, embodiments can advantageously be applied to arbitrary data sequences; there is no requirement for a repeating pattern. In one embodiment, the data-dependent jitter (DDJ) components are separated by analyzing the jitter signal in the time domain. The residual jitter components are transformed into the frequency domain, and a modified CFAR algorithm using a dual sliding window technique is employed to separate the periodic jitter (PJ) component from the random jitter (RJ) component.

In identifying the root causes of jitter in a system, it is desirable to categorize the jitter content as accurately and with as much detail as possible. If various categories of jitter are mixed together, the identification of the root cause becomes increasingly difficult. Disadvantageously, existing methods of jitter decomposition typically do not identify data-dependent random jitter (DDRJ), device state dependent jitter (DSDJ), inter-symbol interference (ISI), or bounded uncorrelated jitter (BUJ).

Jitter testing is often performed on repeating test patterns that are meant to imitate real data. It is sometimes the case, however, that the jitter content in repeating test patterns does not accurately represent the jitter content in real data. In addition, repeating patterns may not be available in the system. Existing jitter decomposition methods do not allow for the testing of arbitrary data sequences.

One embodiment includes a process that performs one or more of the following:

1. takes oversampled data from a digital communications signal as input;
2. demodulates the waveform to obtain the TIE signal;
3. decomposes the TIE signal into its various component signals; and
4. quantifies the statistics of each of the component signals.

Multiple techniques to measure time interval error (TIE) are disclosed herein. In one embodiment, the technique is applicable to an arbitrary data sequence. Exemplary embodiments include, but are not limited to, the following:

One embodiment corresponds to a method that accurately identifies the bit sequence in the presence of relatively large quantities of jitter. By contrast, when subjected to relatively large amplitudes of jitter, existing methods of bit sequence identification can fail, leading to difficulty in determining an accurate reference edge crossing time for demodulating a signal. See, for example, Damm, Wendell, *Oscilloscope Connectivity Made Easy*, Tektronix, Inc., (Beaverton 2000), Ch. 5, pg. 125.

Figure 5:
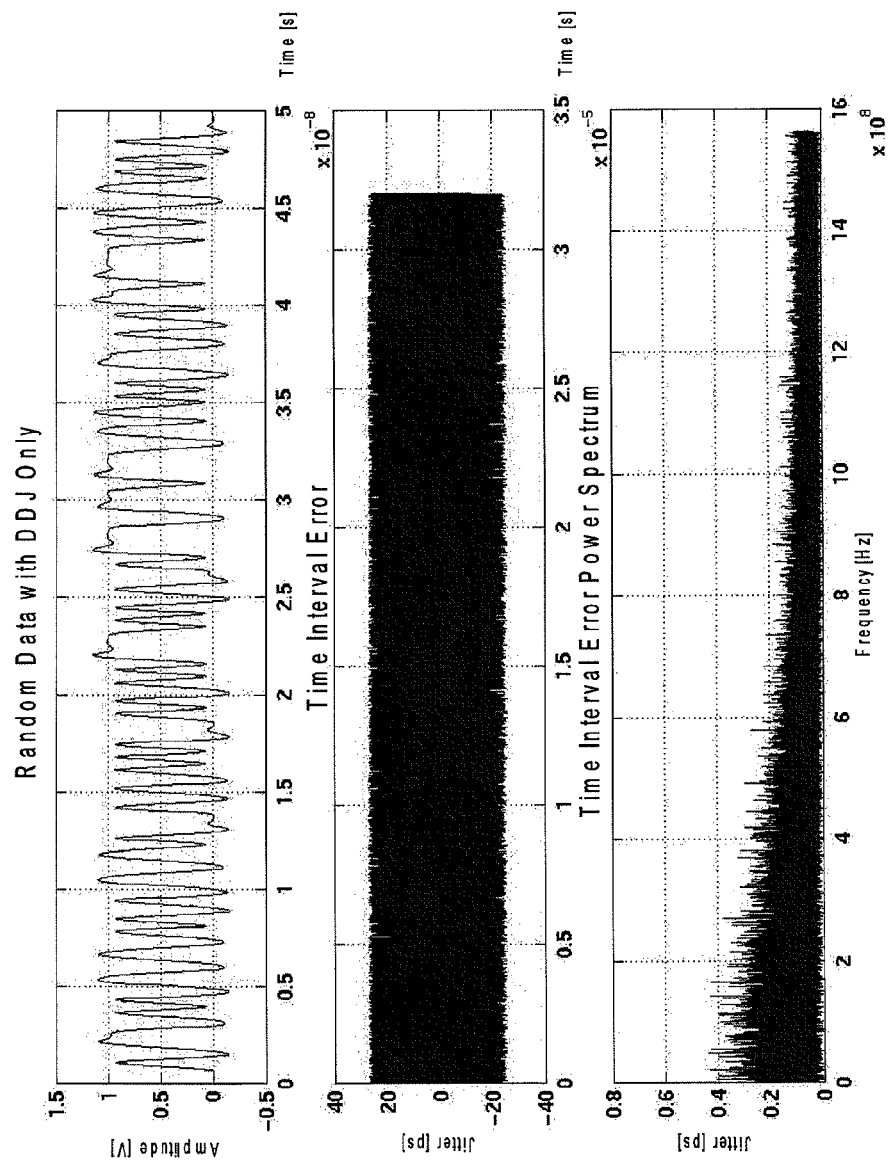
FIG. 5 illustrates an example of time interval error (TIE) associated with data-dependent jitter (DDJ).

One embodiment corresponds to a method of removing data-dependent jitter (DDJ) 310 content from the signal, which permits a relatively accurate analysis of the random jitter (RJ) 304 and periodic jitter (PJ) 308 content in the residual signal. In many signals, the dominant jitter process is data-dependent jitter (DDJ) 310. The presence of relatively large amounts of data-dependent jitter (DDJ) 310 can cause some existing methods to fail as discussed earlier in connection with FIG. 5.

One embodiment is a method for further decomposing data-dependent jitter (DDJ) 310 into inter-symbol interference (ISI) jitter 314, device state dependent jitter (DSDJ) 604, and duty cycle distortion (DCD) jitter 316.

One embodiment is a method that advantageously identifies both the location and bandwidth of the periodic jitter (PJ) 308 components from the spectrum. Jitter content is transformed into the frequency domain using a Fourier Transform (FT) to identify periodic jitter (PJ) 308 content. Another embodiment uses a least squares method or total least squares method of periodic jitter separation. Existing methods that separate tones identified as periodic jitter (PJ) 308 often disadvantageously neglect the power content in the apron and side lobes of those tones.

One embodiment corresponds to a method that identifies data-dependent random jitter (DDRJ) 602 and makes a relatively accurate calculation of both random jitter (RJ) 304 and total jitter (TJ) 302. With some signals, the random jitter (RJ) 304 content can be broken down into data-dependent random jitter (DDRJ) 602, where various data-dependent random jitter (DDRJ) 602 distributions are correlated with the data content of the signal. This variation in the distributions can cause inaccuracies in the computation of $TJ_{pp}$ and $RJ_{pp}$.

Although this invention will be described in terms of certain preferred embodiments, other embodiments that are apparent to those of ordinary skill in the art, including embodiments that do not provide all of the benefits and features set forth herein, are also within the scope of this invention.

Introduction and Overview

Figure 7:
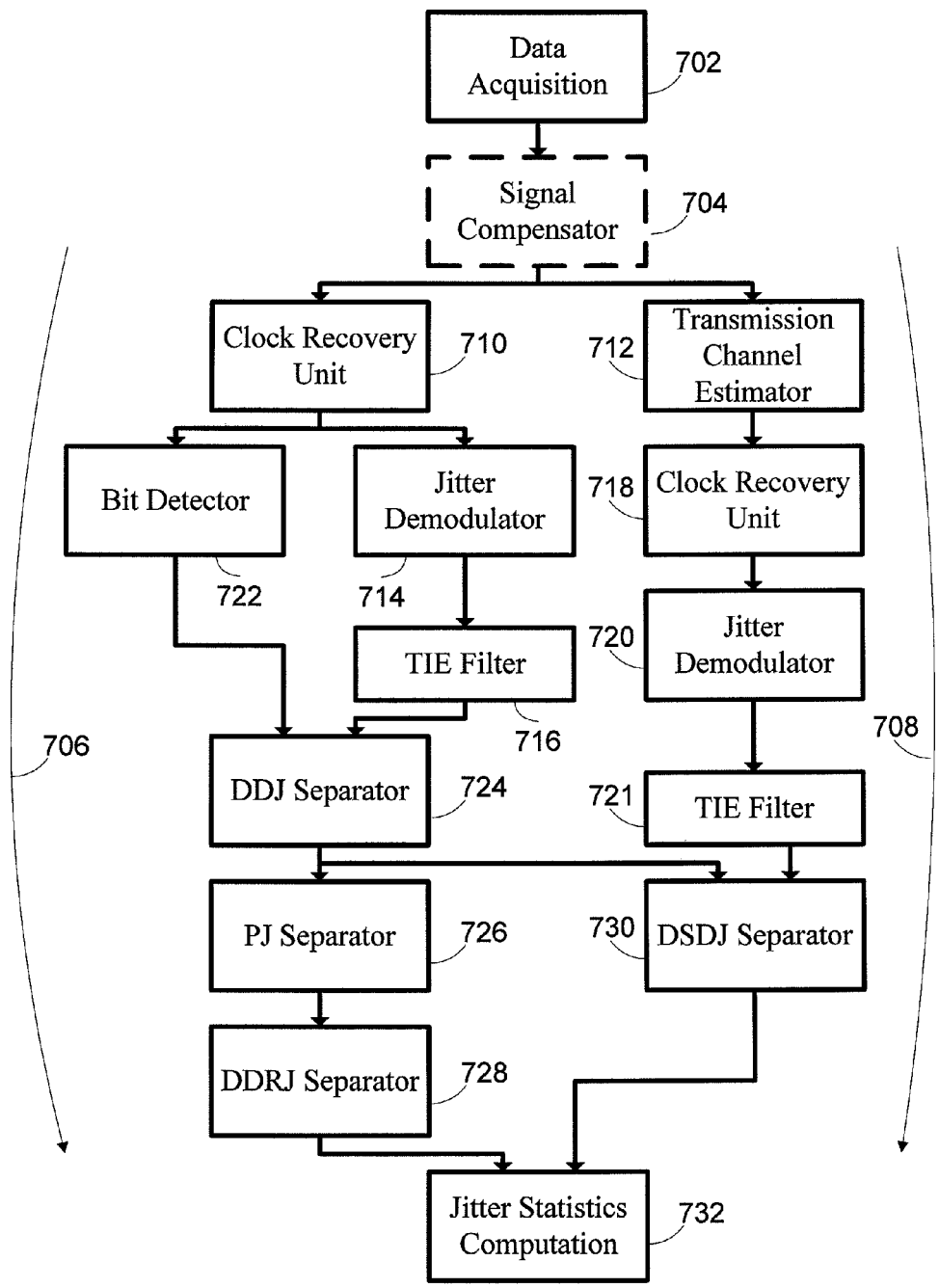
FIG. 7 illustrates one embodiment of a jitter analysis and decomposition system.

FIG. 7 illustrates one embodiment of a jitter analysis and decomposition system. For clarity, selected data flows have been omitted from FIG. 7. This embodiment begins with the input of an oversampled digital signal, and results in an analysis of the jitter content of the signal, including one or more values for: total jitter (TJ) 302, random jitter (RJ) 304, data-dependent random jitter (DDRJ) 602, deterministic jitter (DJ) 306, periodic jitter (PJ) 308, data-dependent jitter (DDJ) 310, inter-symbol interference (ISI) jitter 314, device state dependent jitter (DSDJ) 604, duty cycle distortion (DCD) jitter 316, and bounded uncorrelated jitter (BUJ) 312, which were described earlier in connection with FIG. 6.

An overview of a decomposition process will now be described. The process may optionally begin by compensating 704 the signal to eliminate the effects of the measurement system. All measurement systems have non-ideal characteristics that will affect the system under test to some extent. In the case of a digital signal, the jitter content will be adversely affected by these impairments. These effects may, or may not, be deemed significant to the end results. In the case of simulated data input, the signal compensation step 704 is bypassed as the input is not subject to a data acquisition or measurement system 702 in that case.

After the intended signal under test has been recovered, the process divides into two paths: a primary path 706 and a secondary path 708. The secondary path 708 performs a synthesis of the inter-symbol interference (ISI) jitter 314 components in the signal. The primary path 706 separates the rest of the jitter components. In the primary path 706, the jitter demodulation begins. In one embodiment, the jitter demodulation is implemented by interpolating between the data samples to locate the threshold crossings, and by associating a time stamp with each threshold crossing. Given these time stamps, the related bit pattern of the signal can be determined, and a reference clock corresponding to an ideal reference clock can be constructed. It will be understood that an approximately ideal reference clock is also within the scope of the invention. The threshold time stamps are compared to the reference clock to generate a time error for each threshold crossing. This time error series, herein referred to as the time interval error (TIE) series, represents the jitter of the signal.

The illustrated embodiment proceeds to decompose the TIE series according to varying component qualities such as unbounded random jitter and bounded deterministic jitter. This can be computed using a model in which random jitter exhibits an unbounded Gaussian distribution, and will typically be calculated as peak-to-peak for a specified probability. To calculate its peak-to-peak probability, the standard deviation of its distribution must be known. As such, the random and deterministic components should be decomposed before a total jitter value is calculated.

Jitter analysis can also advantageously be used to analyze the root causes of jitter. The root causes of jitter should be known and controlled in order to facilitate system design and to guarantee system performance. The illustrated embodiment further decomposes the TIE series into various components according to classifications such as: data-dependent random jitter (DDRJ) 602, periodic jitter (PJ) 308, data-dependent jitter (DDJ) 310, and duty cycle distortion (DCD) jitter 316. The more accurately these components can be identified, the easier it is to pinpoint the root causes or sources of undesired jitter.

In the secondary path 708, the transmission channel is estimated and modeled to generate a reproduction of the signal under test, so that in the illustrated embodiment, the only jitter present in the reproduced signal is from inter-symbol interference (ISI) jitter 314. In the illustrated embodiment, the reproduced signal continues through the same or approximately the same jitter demodulation process used with the primary path 706, and the inter-symbol interference (ISI) jitter 314 is generated. The inter-symbol interference (ISI) jitter 314 is used to separate the data-dependent jitter (DDJ) 310 into its inter-symbol interference (ISI) jitter 314 and device state dependent jitter (DSDJ) 604 components.

In the illustrated embodiment, the processing concludes with a computation of the statistics of the various components of jitter that have been decomposed from the input signal.

A Method of Jitter Analysis for Digital Communication Signals of Arbitrary Data Sequences One embodiment of a system and method for decomposition of jitter components will now be described with reference to FIG. 7.

Data Acquisition 702

The illustrated embodiment uses an oversampling technique to obtain the input data samples. For example, these samples can be obtained in practice with a single-shot sampling oscilloscope (several of which are available on the market today), the samples can be generated from a simulation environment, and the like. It will be understood that in hardware implementations, the data acquisition equipment 702 (or simulation) can correspond to commercially-available equipment, such as to single-shot sampling oscilloscopes, or to special purpose hardware. In addition, it should be noted that the jitter decomposition techniques can be external to such equipment or can be integrated with such equipment.

By using a single-shot sampling oscilloscope, the location of every edge within the capture duration can be identified and timestamped accordingly. The available memory depths and triggering capabilities of commercially-available instruments provide that occurrences of interest can be captured within the set duration.

In another embodiment, input data is obtained from a single-shot, contiguous, time interval analyzer, where every consecutive edge is timestamped according to its measured threshold crossing. This input data provides the Cumulative Measured Time Series of Edges used by a Pseudo-PLL 904 in a first clock recovery unit 710 that will be described in greater detail later in connection with FIG. 9. The time interval analyzer can also provide the Edge Type Series used by the Pseudo-PLL 904. Alternatively, the rising or falling state of the elements of the Edge Type Series can be arbitrarily assumed. As such, the system flow can skip the Threshold Detector of the clock recovery unit that will be described in greater detail later in connection with FIG. 9. While a time interval analyzer can advantageously provide threshold timing information, a time interval analyzer by itself typically does not provide a description of the shape of a pulse. Given the absence of the acquired signal data in this case, an alternative method for estimating transmission channel effects, such as data-dependent jitter should be used. In one embodiment, the secondary path 708 to determine the inter-symbol interference (ISI) is not used when the timing information is provided by a time interval analyzer and no other forms describing the shape of the timing pulses are provided.

In another embodiment, a hardware system demodulates the data waveform to obtain an electrical TIE signal. An example of such a hardware system is a hardware phase-locked loop (PLL). The TEE signal can then be sampled by an analog-to-digital converter to generate the TEE series used by a first TIE filter 716, and the system flow may skip ahead to the first TIE filter 716, one embodiment of which will be described later in greater detail in connection with FIG. 11. Similar to the previous alternate embodiment, an alternative technique for estimating the effects of the transmission channel should be performed. In one embodiment, the secondary path 708 to determine the inter-symbol interference (ISD) is not used when the timing information is provided by a hardware PLL and no other forms describing the shape of the timing pulses are provided.

Optional Signal Compensation 704

Figure 8:
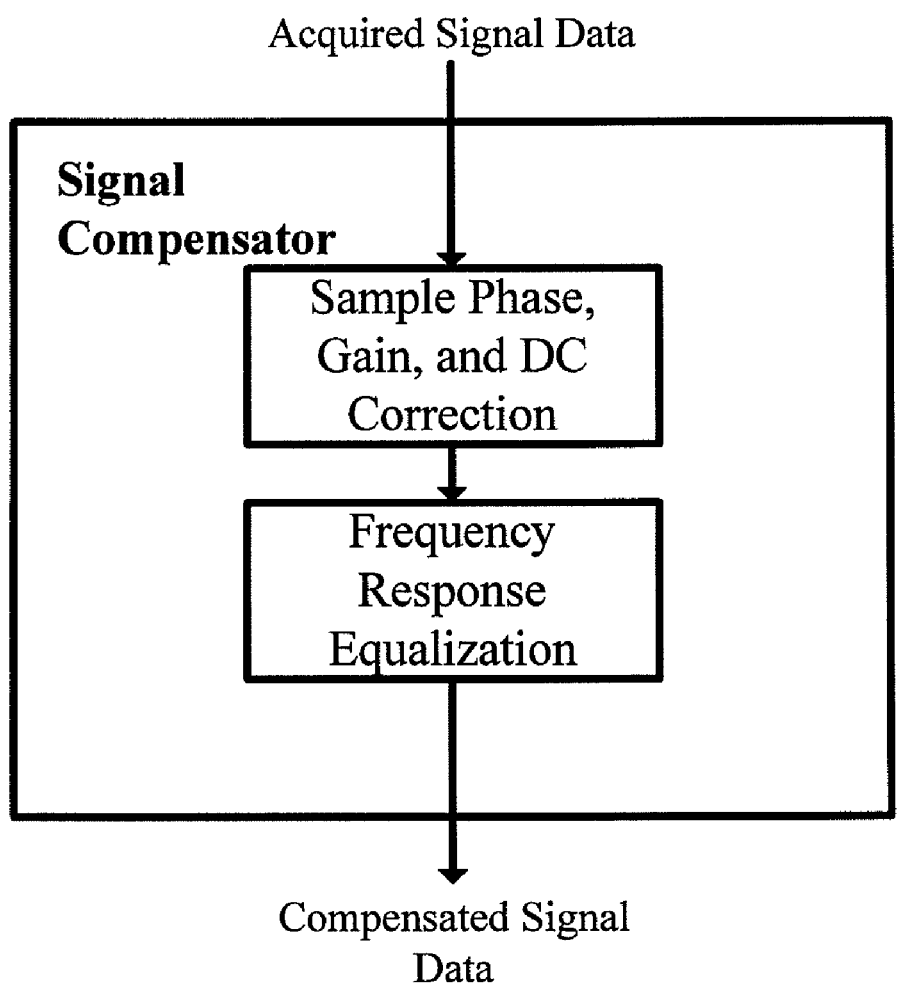
FIG. 8 is a block diagram that illustrates data flow for a Signal Compensator.

By oversampling, the phase and amplitude information of the signal is relatively well maintained. Because of this, it is possible to implement compensation algorithms to reverse the signal degradation effects of the measurement channel. These compensation algorithms are optional because the significance of the degradation effects will vary depending on the instrument and the signal, and the instrument may perform some form of compensation internally. In one embodiment, two effects are considered as illustrated in FIG. 8:

1. Constant phase, gain, and DC errors between samples due to multiplexed analog-to-digital converters (ADC's) in the oscilloscope front-end.
2. Low pass filtering of the data signal due to bandwidth limitations in the measurement channel.

Compensation of Constant Sample Phase, Gain, and DC Error

In one embodiment, a sampling rate that is at least four times the bit rate is used in order to get enough samples on each edge for the interpolation of the zero crossings. A typical sampling oscilloscope for a 3.3 Gb/s serial link operates at 20 GS/s. Multiple analog-to-digital converters (ADCs) are used because of the construction of these oscilloscopes. Each of these converters is clocked at a fraction of the 20 GS/s rate and is skewed relative to each other in order to sample the incoming signal with an equal spacing. Each of these clocks may have a fixed delay (phase) error relative to each other. In addition to this delay error, each ADC will have a small fixed DC offset error and a gain error that is different from the other ADCs. These impairments contribute to the noise floor of the instrument and can greatly affect jitter measurement accuracy.

It is possible to calibrate each ADC to have the correct delay (phase), equal gain, and zero DC offset. The compensation structure is a demux of the high sample rate sequence into a set of N separate sequences, where N is the number of ADCs. Each sequence is then subjected to three adjustments including a fractional delay FIR filter, a gain correction, and a DC offset correction. The signals are then multiplexed to the high data rate. The parameters for the compensation structure are obtained through the use of a calibration signal with known characteristics. This signal can take on many forms, but in general it should be wideband in order to allow for good delay resolution. Methods to extract the parameters from the signal are well known to those skilled in the art. It should be noted that the signal compensator 704 can be integrated with the data acquisition 702. In one embodiment, the signal compensator 704 is not used.

Equalization of Measurement Channel Band-Limiting Effects

Using network analyzer or time-domain-reflectometry measurements of the channels in question, or characterization data of the front-end of the instrument, inverse models can be generated to equalize the signal and remove the effect of the test fixture. These inverse models can be applied to the data by the signal compensator 704 in order to equalize the received signal.

Undersampling methods do not support these techniques because they do not recover a continuously sampled waveform that can later be equalized.

An output of the optional signal compensation block 704, where used, or the data acquisition block 702 where not used, is provided as an input along two paths: one to a first clock recovery unit 710 and another to the transmission channel estimator 712.

Clock Recovery Unit 710, 718

In the illustrated embodiment, a first clock recovery unit 710 is used in the primary path 706 and a second clock recovery unit 718 is used in the secondary path 708. One embodiment of an architecture for a clock recovery unit is described in greater detail later in connection with FIG. 9. In the primary path 706, the first clock recovery unit 710 operates on a compensated signal data, which in the illustrated embodiment, is provided by the signal compensator 704. In the secondary path 708 of the illustrated embodiment, the input to the second clock recovery unit 718 corresponds to the inter-symbol interference (ISI)-only signal data.

Figure 9:
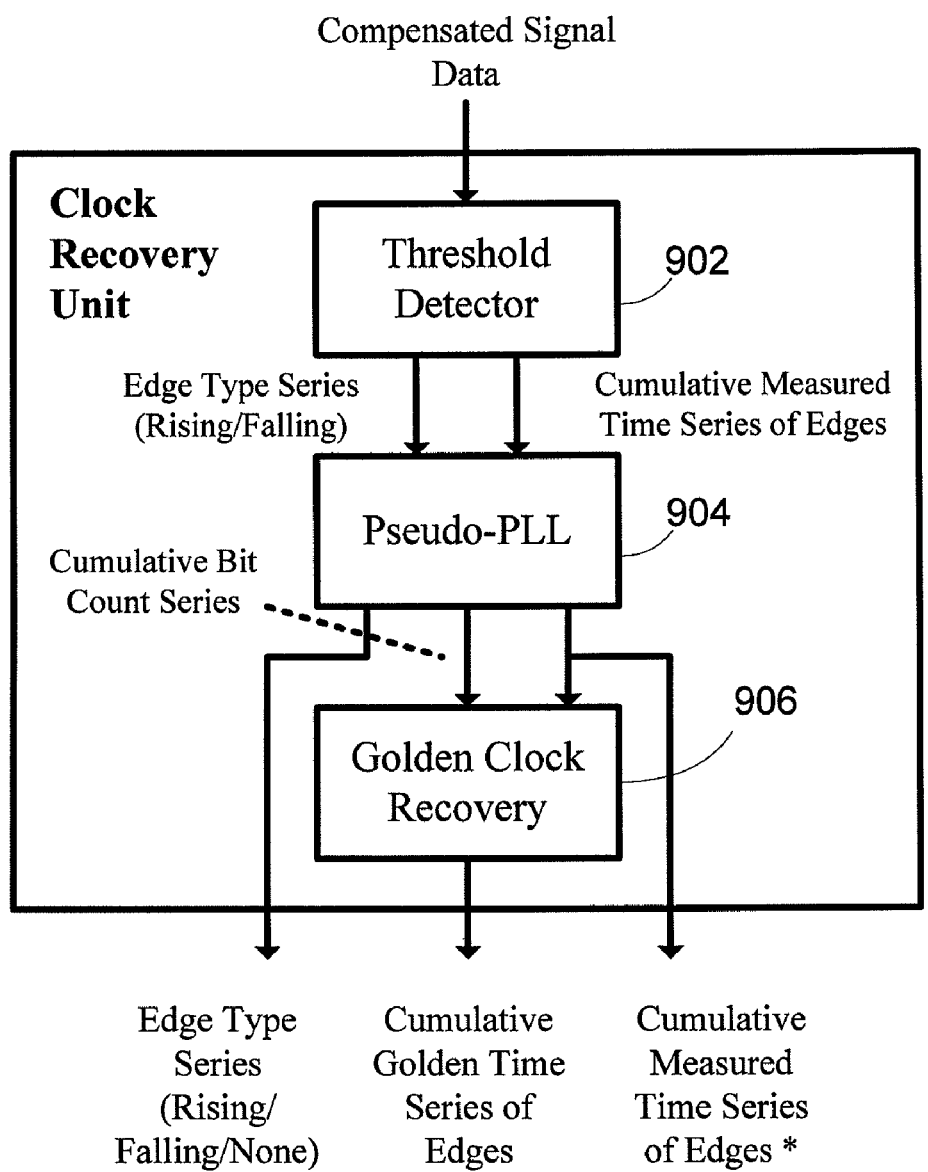
FIG. 9 illustrates one embodiment of a clock recovery unit.

With reference to FIG. 9, the illustrated clock recovery unit includes three subcomponents. These components are a threshold detector 902, a pseudo-PLL 904, and a golden clock recovery block 906. It will be understood that the signals shown with the clock recovery unit illustrated in FIG. 9 corresponds to the signals for the first clock recovery unit 710.

Threshold Detector 902

Sample points straddling the threshold are interpolated to calculate the time-stamp of the threshold crossing. Various methods of interpolation can be used to calculate this value, with varying rates of accuracy depending on the signal characteristics and the method selected. In the illustrated embodiment of the threshold detector 902, a linear interpolation technique is used. As an output, the threshold detector 902 provides a cumulative time series of the threshold crossings and a corresponding edge-type identifier series that identifies whether an edge is rising or falling.

Pseudo-PLL 904

A pseudo-PLL 904 is implemented to calculate the number of bit periods occurring between consecutive edges. While the pseudo-PLL 904 will be described in the context of binary data, it will be understood by the skilled practitioner that the principles and advantages described herein are also applicable to multilevel data. In one embodiment, the pseudo-PLL 904 is implemented in software or firmware as an algorithm. On account of the relatively large amounts of jitter that are typically measured in instrument-generated jitter tolerance signals, the cumulative bit periods can vary by more than half a unit interval (UI). A conventional method described by Equation 2, is not sufficient under these conditions. See Damm, Wendell, *Oscilloscope Connectivity Made Easy*, Tektronix, Inc., (Beaverton 2000), Ch. 5, pg. 125.

$$N = \left\lfloor \frac{t_{edge2} - t_{edge1}}{T} + 0.5 \right\rfloor \quad \text{Equation 2}$$

In Equation 2, $t_{edge\ i}$ is the time stamp for the ith edge, T is the bit period, N is the number of bits and $\lfloor \cdot \rfloor$ indicates a truncation to an integer.

In the illustrated embodiment, the pseudo-PLL is implemented as code in firmware or in software. It will be understood, however, that the pseudo-PLL can also be implemented in hardware or in a combination or hardware and software. The sample of the pseudo-PLL code described herein advantageously permits measurement of relatively large amounts of jitter. In contrast to a conventional PLL implementation, the pseudo-PLL described herein is not intended to provide a recovered clock reference. Instead, the pseudo-PLL provides a count of the number of bit periods or symbol periods that have elapsed during spans where the bits remain constant and there are no edge transitions. Combined with a golden clock recovery block 906 that will be described in greater detail later, an accurate reproduction of the bit sequence with its ideal edge locations can advantageously be provided. The variables used in the sample pseudocode are described in Table 1.

TABLE 1

Variables for Pseudo-PLL

| Variable Name | Description |
| --- | --- |
| PLL_CONSTANT | A weighting factor to control the effect of variation in period lengths on the predicted lengths of proceeding periods. |
| MEASURED_TIME | The sequence of measured edge location times output from the Threshold Detector. |
| ELOCK | The predicted time of the proceeding period. |
| ESTIMATED_SYM-BOL_RATE | Symbol rate estimate as input by the user (for example). |
| COUNT | Ongoing count of the number of bit periods elapsed. |
| CLOCKS | Cumulative count of the bit periods elapsed at each edge location. |
| X(I) | If X is a vector X(I) is the Ith element of the vector. |

Pseudocode for Pseudo-PLL Implementation

```
PLL_CONSTANT = 0.1
ELOCK = MEASURED_TIME(1)
PERIOD = 1/ ESTIMATED_SYMBOL_RATE
COUNT = 1
CLOCKS(1) =1
for INDEX = 2 to LENGTH(MEASURED_TIME)
  while ELOCK < (MEASURED_TIME(INDEX) – 0.5 * PERIOD)
    ELOCK = ELOCK + PERIOD
    COUNT = COUNT + 1
  end while
  ELOCK = ELOCK + PLL_CONSTANT * (MEASURED_TIME(INDEX) – ELOCK)
  CLOCKS(INDEX) = COUNT
end for
```

The output of the Pseudo-PLL 904 provides a cumulative bit count for each edge encountered, a contiguous edge-type identifier series (whether each edge is rising, falling, or if no edge transition has occurred), and a contiguous cumulative time series of the threshold crossings, where non-numeric placeholders have been advantageously inserted where no edge transition occurs between runs of high bits or low bits. The non-numeric placeholders can be used to indicate the presence of multiple high or multiple low bits to the jitter demodulator 714. It will be understood that in multilevel systems, the non-numeric placeholders can be used to indicate the presence of multiple cycles of the same state. It will also be understood that in other embodiments, other techniques can be used to indicate the presence of multiple high or multiple low bits, such as a separate signal.

Golden Clock Recovery Block 906

Figure 1:
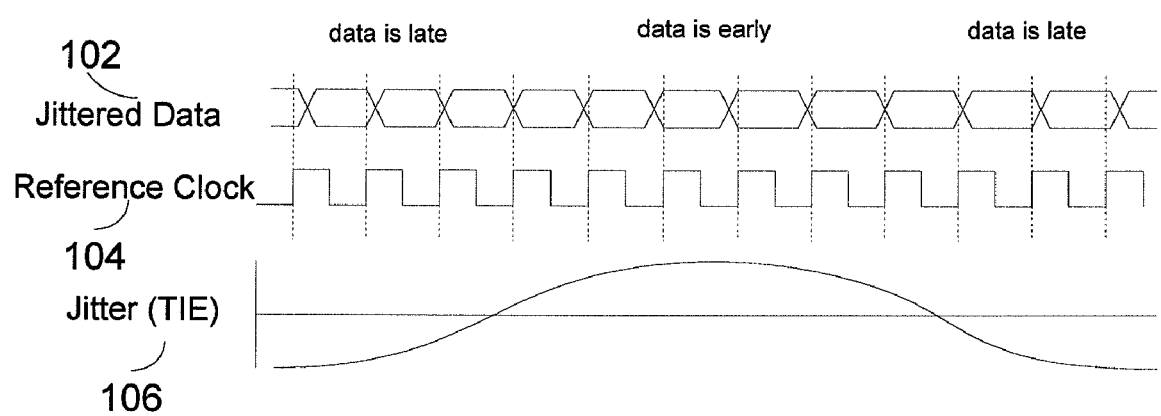
FIG. 1 illustrates a digital data signal relative to an ideal reference clock.
Figure 2:
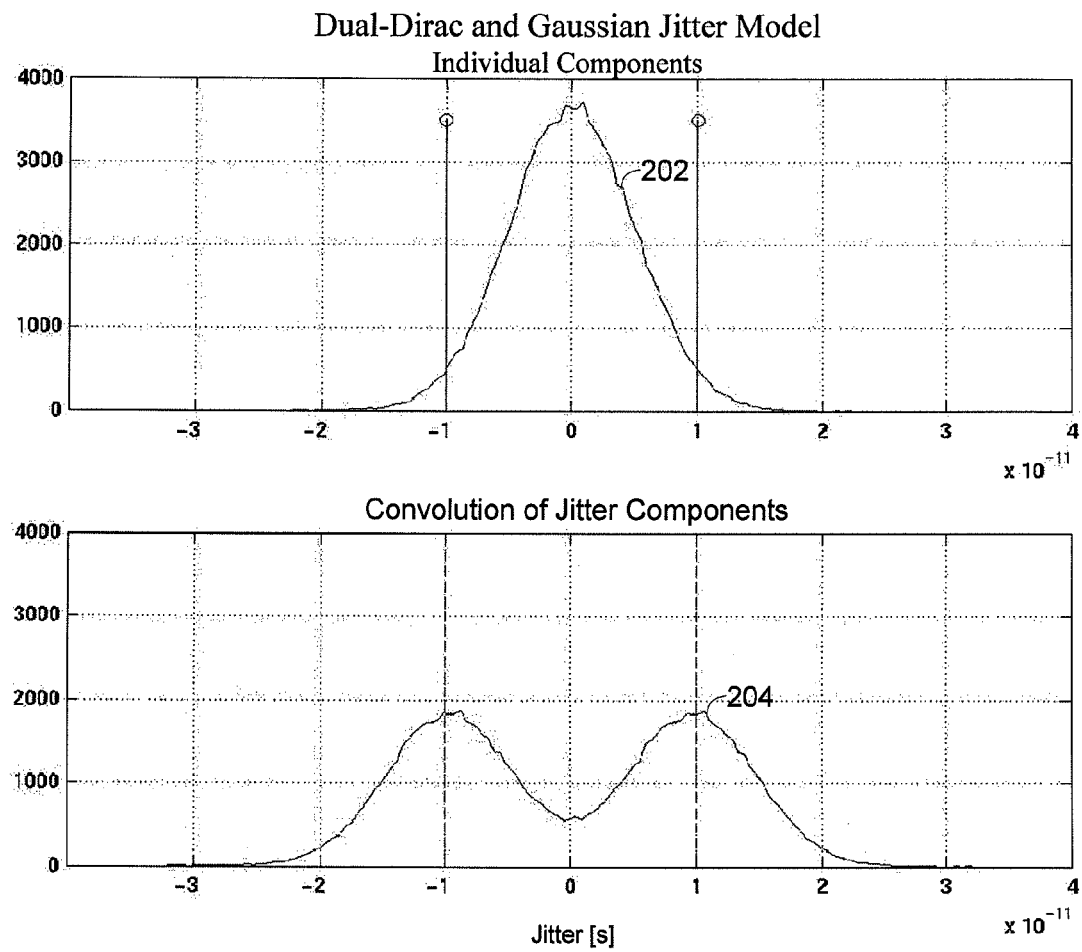
FIG. 2 illustrates a simplified jitter model.
Figure 3:
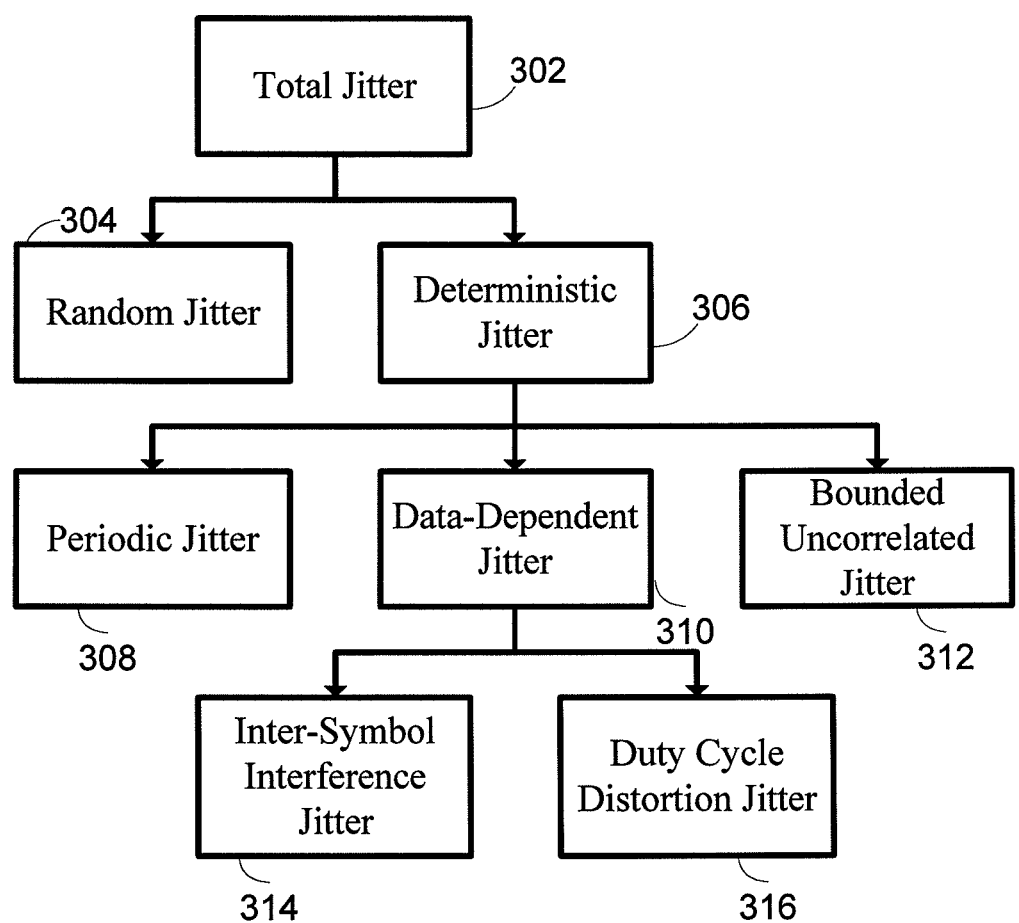
FIG. 3 is a tree diagram that illustrates selected components of jitter.
Figure 4:
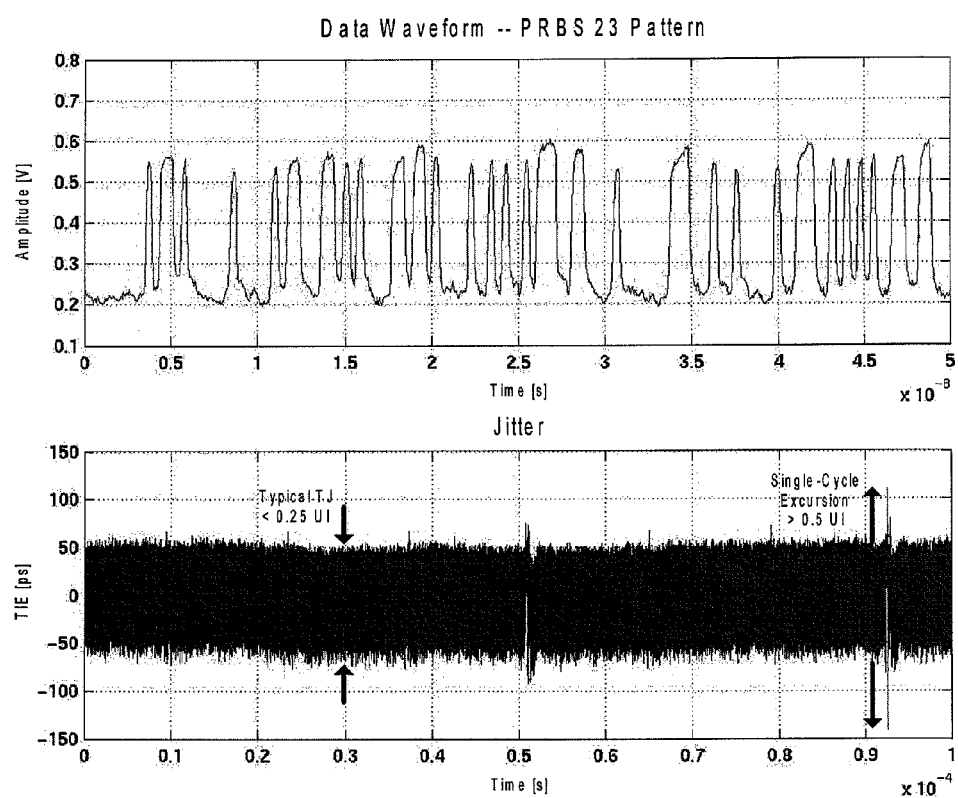
FIG. 4 illustrates a sampled waveform and its corresponding time interval error.

The golden clock recovery block 906 generates a jitter-free reference or "golden" time stamp value for threshold crossings so that the reference time stamp values correspond to threshold crossings at a fixed symbol rate. It will be understood that the reference can be approximately jitter free. The reference clock 104 described earlier in connection with FIG. 1 is an example of a waveform generated from golden time stamp values for threshold crossings. The golden clock recovery block 906 takes the cumulative time stamp series for each edge versus the cumulative number of bits series and performs a linear least-squares fit to the threshold crossings. See, for example, Cosart, Lee D. and Luiz Peregrino, *Time Domain Analysis and its Practical Application to the Measurement of Phase Noise and Jitter*, IEEE Transactions on Instrumentation and Measurement, Vol. 46, No. 4, August 1997, pgs. 1016-1019. Graphically, the slope of the resulting least-square fit line represents the measured average bit period or symbol period for the reference clock. The least-squares fit line gives the measured time as a function of number of bits, for the measured average bit period. In the illustrated embodiment, the golden clock recovery block 906 provides a "golden" time stamp value for every edge threshold crossing in the signal as an output.

Jitter Demodulator 714, 720

Figure 10:
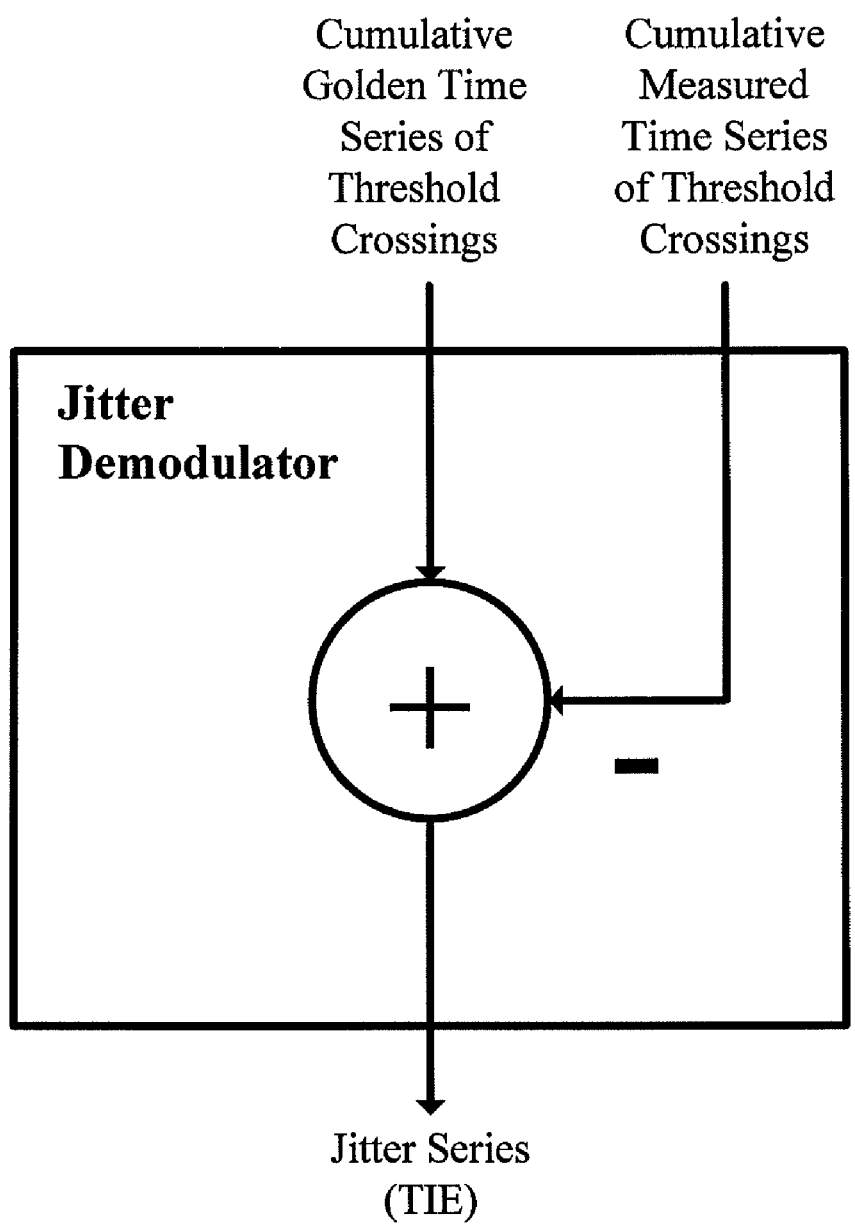
FIG. 10 illustrates one embodiment of a jitter demodulator.

As illustrated in FIG. 10, the jitter demodulator 714, 720 performs a subtraction between the golden time stamp signal and the measured time stamp signal to generate a series of jitter values in units of time for every actual edge in the signal. This jitter series is termed the time interval error (TIE) signal herein. For multiple high or low bits, where there is no edge occurrence, the jitter value can be interpolated. Various methods of interpolation are applicable. In the illustrated embodiment, a previous neighbor interpolation scheme is used, as this reflects an implementation of a digital non-linear PLL commonly used in high-speed receivers where the phase is held constant between data edges.

In another embodiment, the TIE signal can be generated using a hardware implementation of a linear PLL, where a sampling instrument samples the phase error output signal of the PLL.

Time Interval Error Filter

Figure 11:
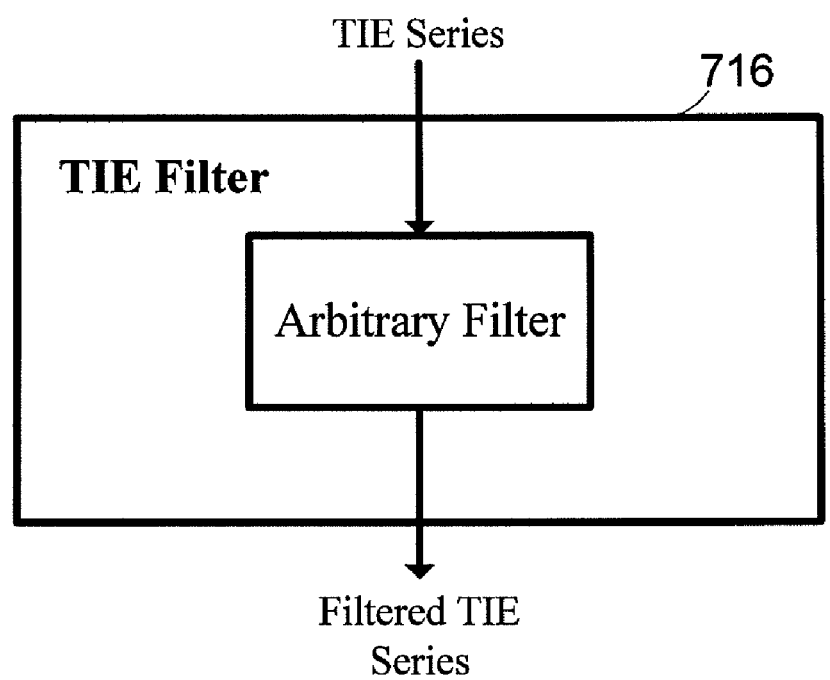
FIG. 11 illustrates one embodiment of a time interval error (TIE) filter.

As illustrated in FIG. 11, the TIE signal can be passed through an arbitrary digital filter according to various industry specifications. One example, typical of some high-speed backplane specifications, is a first-order Butterworth highpass filter with a corner frequency equal to the bit rate divided by 1667.

Another example, from a reference clock specification, corresponds to a second-order Butterworth bandpass filter with a low-frequency corner of 12 kHz and a high-frequency corner of 20 MHz. The low-frequency corner portion of the filter is used to reject low frequency wander. The high-frequency corner portion of the filter can aid in the correlation between time domain jitter measurements and frequency domain total integrated phase noise measurements typically performed over a 12 kHz to 20 MHz bandwidth.

Bit Detector 722

Figure 12:
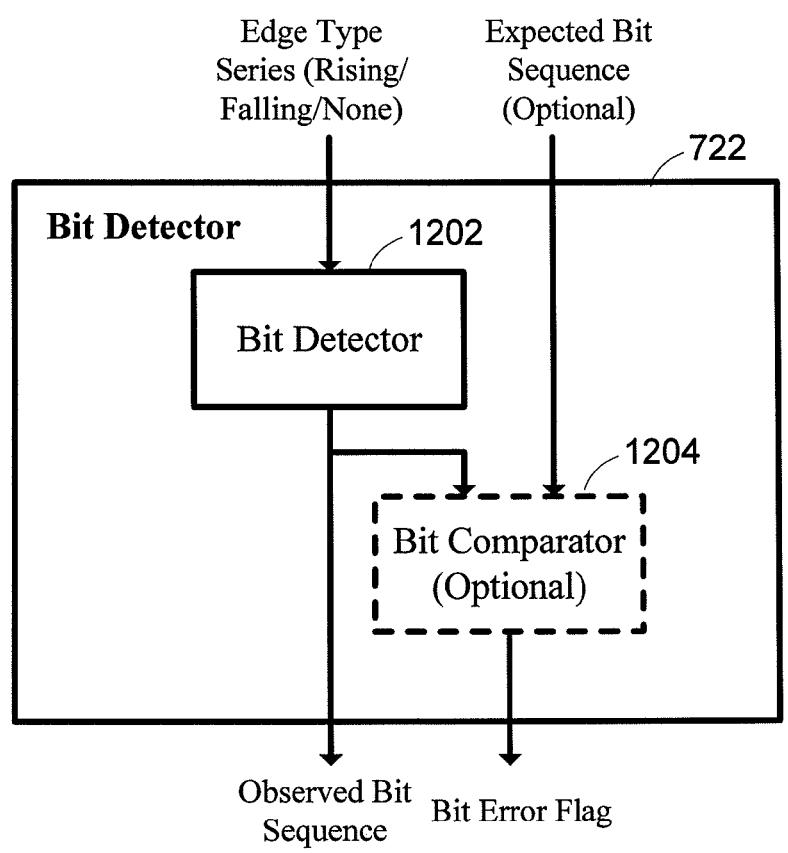
FIG. 12 illustrates one embodiment of a bit detector.

FIG. 12 illustrates data flow for one embodiment of the bit detector 722. In the illustrated bit detector 722, the bit detector 722 includes a bit detector 1202 and an optional bit comparator 1204. The contiguous edge-type series output from the clock recovery unit 710 is provided as an input to the bit detector 722. The bit detector 722 converts this series to a bit series of 0 and 1 logic values, where the bit value is aligned to follow the corresponding edge of the reference clock. For example, a pattern of a rising edge, a falling edge, and no edge, would translate to a bit sequence of 100 in binary).

The bit detector 722 can optionally include the bit comparator 1204. The optional bit comparator 1204 receives an expected bit sequence as an input, and compares the expected bit sequence with the calculated bit sequence. If any discrepancies are identified, this can be conveniently flagged to the user. For example, if the discrepancy is due to a failure in the clock recovery unit 710 to recognize the correct pattern, the TIE information can be corrected to reflect the actual bit pattern.

Data-Dependent Jitter (DDJ) Separator 724

Figure 13:
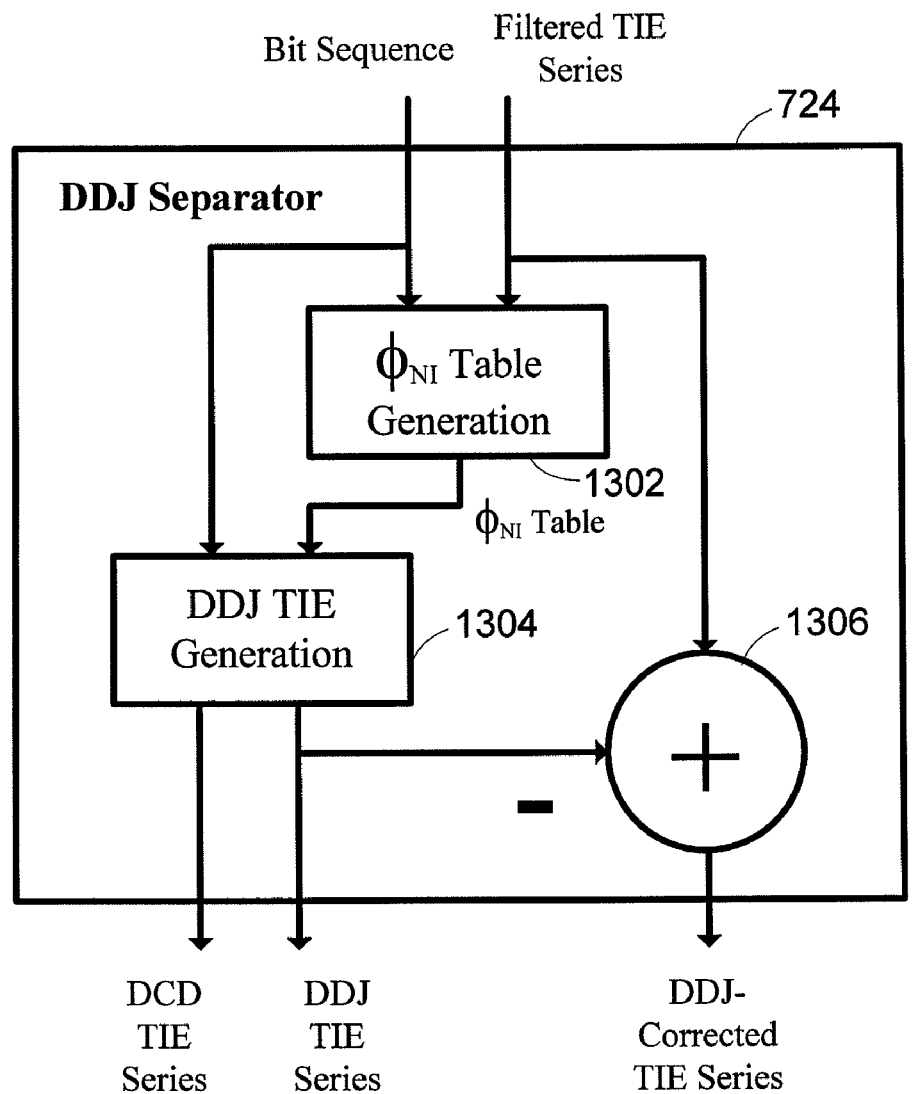
FIG. 13 illustrates one embodiment of a data-dependent jitter (DDJ) separator.

The illustrated data-dependent jitter (DDJ) separator 724 of FIG. 13 includes a ON, table generation block 1302, a DDJ TIE generation block 1304, and a subtractor 1306. As illustrated in FIGS. 7 and 13, the data-dependent jitter (DDJ) separator 724 takes as input the observed bit sequence output from the bit detector 722 and the Filtered TIE series from the TIE Filter 716. In one embodiment, the use of the TIE filter 716 is optional and the TIE series from the jitter demodulator 714 is provided as an input to the data-dependent jitter (DDJ) separator 724. In another embodiment, where the actual bit sequence is available, the actual bit sequence can be provided. The data-dependent jitter (DDJ) separator 724 identifies and separates jitter content that is correlated to the bit pattern, or data, of the signal under test. In the illustrated embodiment, the data-dependent jitter (DDJ) separator 724 identifies and separates jitter content by gathering statistical information on the jitter content as it relates to the surrounding data.

The $\phi_{NI}$ table generation block 1302 gathers the statistical information. For each edge, its "N-tuple Identifier" (NJ) is defined as the N bits surrounding it, where the N bits are made up of the concatenation of the X bit binary word leading up to it, and the Y bit binary word following it (N=X+Y).

For the edge occurring between the (i−1)th and ith bits, Equation 3 can be used.

$$NI_i = [D_{i-X} \ldots D_{i-1} | D_i D_{i+1} \ldots D_{i+Y-1}] \qquad \text{Equation 3}$$

In Equation 3, where $D_k$ is the k-th bit in the sequence, and "|" indicates the edge location within the pattern. This process of identifying the NI values within a bit sequence is illustrated in FIG. 14(a).

The jitter values for edges with a common NI are averaged together and defined as TONI), the average phase offset for each N-tuple. The average phase offset TONI) is defined as the data-dependent jitter associated with each N-tuple.

FIG. 14(b) illustrates an example of a nominal TIE distribution of a complex histogram of the Filtered TEE series with the combined effects of the many jitter components. The total TIE histogram is made up of the sum of the individual TIE histograms for each NI. By isolating the jitter distribution for each NI value, and removing the associated φ(NI) value, the resulting distribution is simplified as illustrated in FIG. 14(c). As illustrated in FIG. 14(c), in one embodiment, by subtracting off the mean value for each NI distribution, the resulting TIE does not contain any data-dependent jitter (DDJ).

The DDJ TIE generation block 1304 generates the data-dependent jitter (DDJ) TIE series. The DDJ TIE series is generated by sequencing the φ(NI) values for each edge of the Observed Bit Sequence. In the illustrated embodiment, a look-up table is generated by the φ$_{NI}$ table generation block 1302 with an entry for every NI and its corresponding φ(NI) value. The look-up table is then cross-referenced by the DDJ TIE generation block 1304 with the observed bit sequence to generate the DDJ TIE series illustrated in FIG. 13. The DDJ TEE series is provided as an input to the device state dependent jitter (DSDJ) separator 730.

The subtractor 1306 generates the DDJ-corrected TEE series, which is provided as an input to the periodic jitter (PJ) separator 726. The DDJ-corrected TIE series can be computed by subtracting the DDJ TIE series from the Filtered TIE series. The DDJ-corrected series includes periodic jitter (PJ) 308, random jitter (RJ) 304, and bounded uncorrelated jitter (BUJ) 312.

In one embodiment, the word lengths X and Y are selected to be as large as possible while still allowing for relatively accurate estimates of the average jitter. In the general case of random or arbitrary data, X and Y can be selected based on the number of samples used to estimate the average jitter and the standard error of that estimate. The X value bits that occur prior to the edge in question will affect the edge location on account of linear channel effects, or inter-symbol interference (ISI) jitter. The Y value bits that occur following the edge in question, as well as those prior to the edge, may affect the edge location on account of device state effects or a source of self-interference. To calculate the duty cycle distortion (DCD) jitter statistic, the data-dependent jitter (DDJ) can be calculated for the case of X=1, Y=1, and this is denoted DDJ$_2$ or by duty cycle distortion (DCD) jitter herein.

In the special case for a repeating bit pattern of known length, X and Y can be chosen where the following equation applies:

$$X+Y=\text{pattern\_length} \quad \text{Equation 4}$$

This constraint allows for a simplification of the data-dependent jitter (DDJ) separation process. Given the predetermined NI values and the repetitive nature of the pattern, elementary matrix mathematics operations can be leveraged to relatively quickly perform the φ(NI) table generation and data-dependent jitter (DDJ) TEE generation.

Although the above discussion uses a contiguous set of bits to form each NI for the data-dependent jitter (DDJ) separation, the skilled practitioner will appreciate that the data-dependent jitter (DDJ) Separator techniques described herein are not constrained by the use of a contiguous set of bits. For example, for some relatively long channel impulse responses, defining the NI on non-contiguous bits can be advantageous.

Periodic Jitter Separator 726

Figure 15:
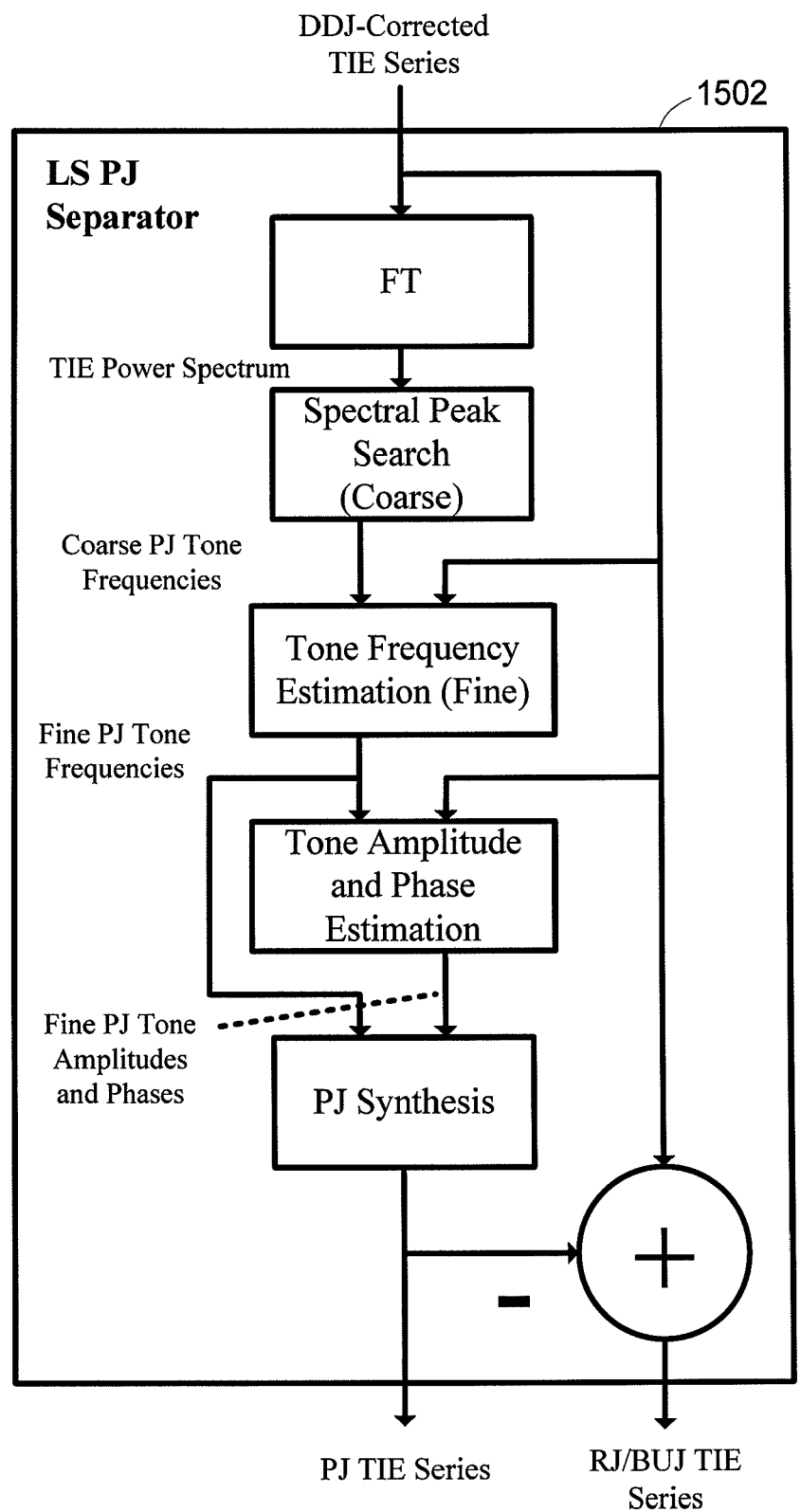
FIG. 15 illustrates one embodiment of a least squares (LS) periodic jitter (PJ) separator.
Figure 16:
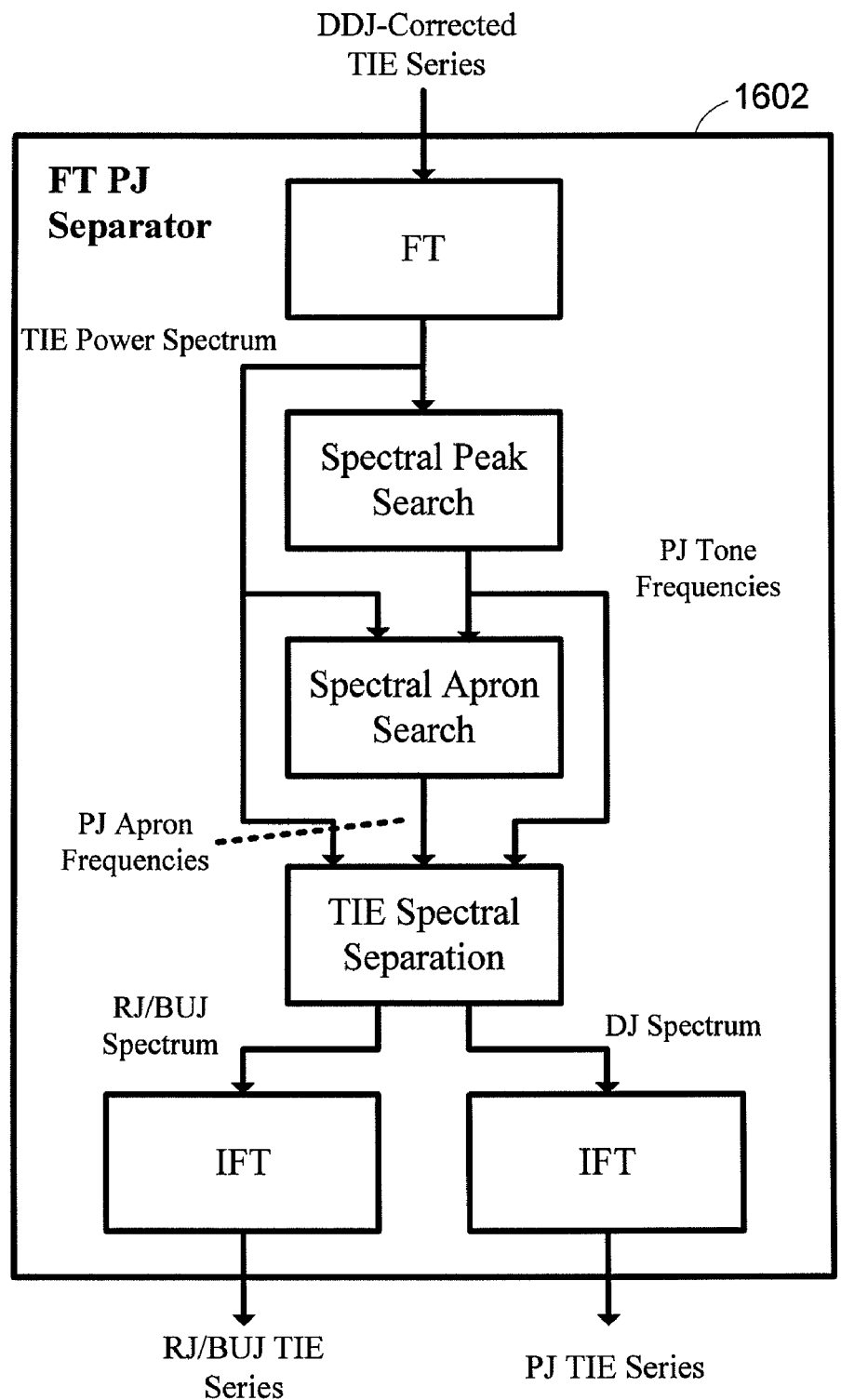
FIG. 16 illustrates one embodiment of a Fourier Transform (FT) periodic jitter (PJ) separator.
Figure 17:
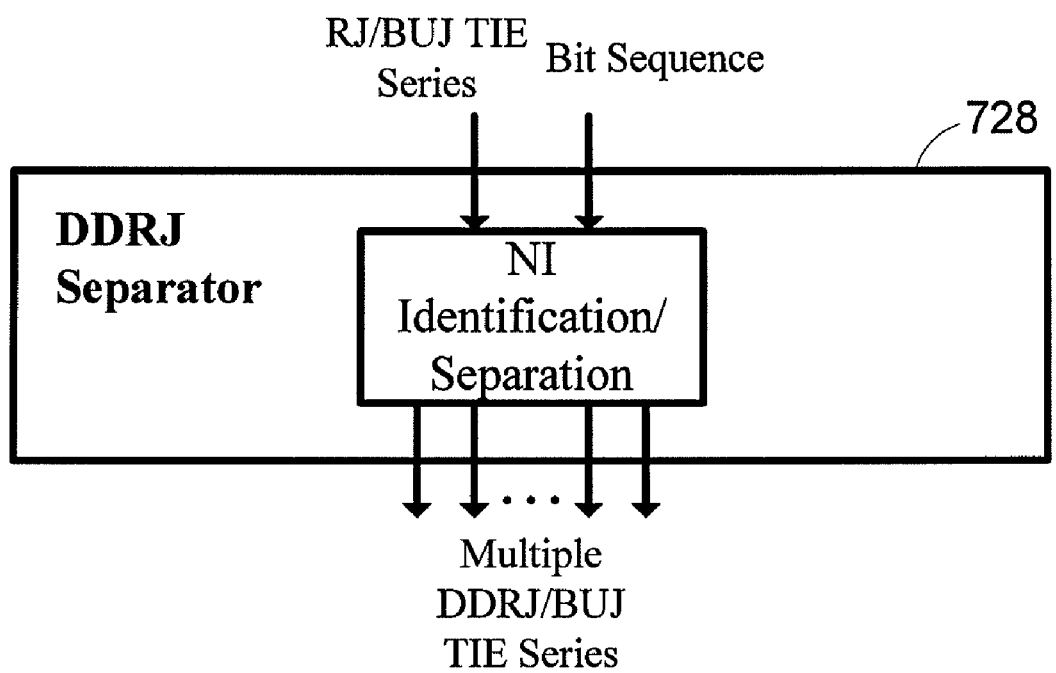
FIG. 17 illustrates one embodiment of a data-dependent random jitter (DDRJ) separator.

The periodic jitter separator 726 can be embodied in many ways. For example, FIG. 15 illustrates one embodiment of a least squares (LS) periodic jitter (PJ) separator 1502. FIG. 16 illustrates one embodiment of a Fourier Transform (FT) periodic jitter (PJ) separator 1602.

The DDJ-corrected TIE from the data-dependent jitter (DDJ) separator 724 is provided as an input to the periodic jitter (PJ) separator 726. The DDJ-corrected TIE signal can include periodic jitter (PJ) 308, random jitter (RJ) 304 and bounded uncorrelated jitter (BUJ) 312. The periodic jitter (PJ) separator 726 identifies and separates relatively significant tones, representing periodic jitter (PJ) 308, from the rest of the DDJ-corrected TIE signal, such as random jitter (RJ) 304 and bounded uncorrelated jitter (BUJ) 312. Two distinct techniques that can be used to perform this function are described herein. According to a least square technique described in connection with FIG. 15, tones are identified in the frequency domain, and a synthesis and separation of the tones is performed in the time domain. According to a Fourier Transform technique described in connection with FIG. 16, both identification and separation of tones is performed in the frequency domain.

Least Squares Method of Periodic Jitter Separation

The model applied is one of multi-tone periodic jitter, with each tone defined by Equation 5. In the illustrated embodiment of the least squares method of periodic jitter (LSPJ) separator 1502, each tone is parameterized by the following characteristics: amplitude (A), frequency (f), and phase (θ). The symbol rate (T) is constant across the tones. Each frequency is relatively constant for a given tone over the signal. Each amplitude and phase is relatively constant for a given tone over a single periodic jitter (PJ) block, such that they can vary over the signal.

$$pj_x = A\sin(2\pi f nT + \theta) \quad \text{Equation 5}$$

In Equation 5, n is the sample index. The least squares method of periodic jitter separation includes the following: coarse frequency classification and estimation using a power spectral density (PSD) and a generalized likelihood ratio test (GLRT); fine frequency estimation using a least squares search; amplitude and phase estimation for each block using least squares based on vector projection; and periodic jitter synthesis using the estimated frequencies, amplitudes and phases.

It should be noted that in the literature, this least squares estimation technique is also sometimes referred to as total least-squares (TLS), or nonlinear least-squares (NLS).

In the illustrated embodiment, the power spectral density (PSD) is estimated using an averaged unwindowed periodogram of block size M. Tones are classified using the jitter power spectral density and the generalized likelihood ratio test (GLRT). The test expressed in Equation 6 is applied to each of the N bins in the periodogram. In the illustrated embodiment, a frequency bin satisfying the criteria set forth in Equation 6 is considered a tone.

$$p(n) = \left(\frac{\Theta(n)}{\Theta_{local}(n,w)} > \tau_{local}\right) \& \left(\frac{\Theta(n)}{\Theta_{global}} > \tau_{global}\right) \quad \text{Equation 6}$$

In Equation 6: p(n) is true for tones and is false otherwise; Θ(n) is the power in the nth bin; Θ(n,w) is the average power over the adjacent w bins; w is the window size and should be an odd integer; Θ$_{global}$ is the average power over all of the bins; τ$_{local}$ is a threshold defined by the user related to the local signal to noise (SNR); and τ$_{global}$ is a threshold defined by the user related to the global SNR as defined by the user. For example, τ$_{local}$ can correspond to a value of about 4 and τ$_{global}$ can correspond to a value of about 0.05, but it will be understood that these thresholds can vary in a very broad range and that other applicable values will be readily determined by one of ordinary skill in the art.

Referring to Equation 6, the first inequality finds only tones that are locally significant, that is, with a relatively high local signal to noise ratio (SNR). The second inequality eliminates tones that have relatively low power, that is, relatively low global SNR, and thus do not contribute significantly to either $RJ_{rms}$ or $PJ_{pp}$. This rule-based classifier is a form of generalized likelihood ratio test (GLRT). The false-alarm rate and detection probability are dependent on $\tau_{local}$, $\tau_{global}$, and w for a given PSD. If the algorithm finds peaks in adjacent bins, an erosion operation can be performed until there are no adjacent peaks. This implies a rule that the minimum separation of tones is equivalent to twice the bin size, as defined by Equation 7.

$$\text{bin\_size} = \frac{F_s}{M} \quad \text{Equation 7}$$

In Equation 7, M is the block size and $F_s$ is the sample rate of the TIE, i.e. the symbol rate of the original waveform.

Once the coarse estimation is complete the frequency estimates will typically be refined. For each of the P coarse frequencies identified, the following can be performed:

1. Form a set of X tones on a grid over $f_{coarse}$+/−bin_size
2. Bandpass filter the experimental data around $f_{coarse}$. This increases the SNR for the particular tone.
3. Find a relatively good, such as optimal, least squares (LS) amplitude and phase to match each of the X tones to the filtered data using vector projection.
4. Compute values for e for each tone, where a computation for e is expressed in Equation 8.
5. The total least squares (TLS) fine frequency estimate, $f_{fine}$, is the frequency with the minimum value for e.

$$e_x = \sum_{n=1}^{N} [\text{rj\_buj\_pj}(n) - pj_x(n)]^2 \quad \text{Equation 8}$$

In Equation 8, rj_buj_pj is the DDJ-corrected TIE series and $pj_x$ is the set of X tones.

After the refined frequency estimates have been found for the identified frequencies, a bulk least-squares approach can be used to estimate the amplitude and phase for each block. For example, the following can be performed:

1. Form the Vandermonde matrix for each frequency, $V_{M \times 2P}$.
2. Form the approximate inverse of the matrix, $V_{M \times 2P}^T$. This approximate inverse is exact if the frequencies land on a frequency bin. The exact inverse is typically not computed since Vandermonde matrices are notoriously ill-conditioned, particularly if the frequencies are closely spaced, near DC, or near Fs/2.
3. For each of the B blocks of rj_buj_pj, the following are performed:
   a. Estimate amplitude and phase vector, $A_{2P \times 1} = V_{M \times 2P}^T \times \text{rj\_buj\_pj}_{M \times 1}$. This is a vector projection of the data onto each of the synthesized tones.
   b. Synthesize the periodic jitter (PJ) signal for this block, $pj_{M \times 1} = V_{M \times 2P} \times A_{2P \times 1}$
   c. Compute the residual RJ_BUJ signal for this block, $\text{rj\_buj}_{M \times 1} = \text{rj\_buj\_pj}_{M \times 1} - pj_{M \times 1}$.

See also, the four-parameter sine-fitting algorithm used in IEEE-STD-1057 and the NLS algorithm described by Händel, Peter, *Properties of the IEEE-Std-1057 Four-Parameter Sine Wave Fit Algorithm*, IEEE Transactions on Instrumentation and Measurement, Vol. 49, No. 6, December 2000, pp. 1189-1193.

In one embodiment, the total number of parameters for this algorithm is P(2B+1), where B=record_length/M, is the number of blocks and M is the block size. Preferably, the total number of parameters is much less than the record length:

$$P(2B+1) \ll \text{record\_length} \quad \text{Equation 9}$$

For relatively large values of B, the formula expressed in Equation 9 can be simplified to the expression labeled Equation 10:

$$M \gg 2P \quad \text{Equation 10}$$

In one embodiment, a block size significantly larger than twice the expected number of tones is desired. If the block size approaches twice the expected number of tones, the system of equations becomes underdetermined.

Fourier Transform Method of Periodic Jitter Separation

FIG. 16 illustrates one embodiment of a Fourier Transform (FT) periodic jitter (PJ) separator 1602. A Fourier Transform (FT), such as a Fast Fourier Transform (FFT), is performed on the input TIE signal to compute an estimate of its power spectrum. A sliding window is used to calculate window averages for each bin in the spectrum. Where the center bin is greater than a selected multiplier times the window average, that bin can be identified as a peak in the spectrum.

The Fourier Transform (FT) periodic jitter (PJ) separator 1602 is similar to the constant false alarm rate (CFAR) filter, which is a specific instance of the generalized likelihood ratio test (GLRT). With the illustrated Fourier Transform periodic jitter separator 1602, the probability of falsely identifying a peak is advantageously set by the selection of the threshold or multiplier and can be fixed for all of the windows. In one embodiment, the window size is chosen to be as large as possible consistent with a constraint that only one significant peak should occur in any window.

A second window of a different size can be used to calculate the window averages for each bin in the spectrum. For each peak identified by the previous test, all adjacent bins which exceed their window average times a selected multiplier can be considered part of the apron of the peak and hence can also be classified as periodic jitter (PJ). This technique aids in recovering the tone power that has spread to surrounding bins due to windowing effects and jitter tone modulation.

Windowing effects relate to the use of a finite length FFT. The presence of a tone whose frequency does not fall precisely on a bin center can induce windowing effects with finite length FFTs. This condition is often called non-circular continuity.

Jitter tone modulation relates to jitter tones that may not be constant in phase, amplitude, or frequency for the duration of the captured signal.

The input TIE spectrum can be conceptually divided into two parts: a periodic jitter (PJ) spectrum and a remaining spectrum. In one embodiment, the periodic jitter (PJ) corresponds to anything identified as a peak or part of the apron, and all other bins are set to a low value, such as to zero or to near zero. The remaining spectrum includes random jitter (RJ) and bounded uncorrelated jitter (BUJ). Two methods for decomposing the periodic jitter (PJ) from the random jitter (RJ) and bounded uncorrelated jitter (BUJ) will be described. A first method includes the computation of inverse Fourier Transforms. A second method includes time-domain filtering.

The random jitter (RJ) and bounded uncorrelated jitter (BUJ) comprise the remaining spectrum that has not been identified as a peak or part of an apron, and bins associated with periodic jitter (PJ) are set to a low value, such as to zero or to near zero. An inverse Fourier Transform (IFT) such as an inverse Fast Fourier Transform (IFFT) is performed on each spectrum to yield the random jitter (RJ) plus bounded uncorrelated jitter (BUJ) TEE signal and the periodic jitter (PJ) TIE signal. In the general case, the bin weighting does not have to be constrained to zero or unity.

The periodic jitter (PJ) separation can also be achieved via linear filtering, where the filter bandwidth is defined by the apron width. In one embodiment, the filter specifications are generated in the frequency domain, and the filtering is applied in the time domain. This implementation avoids the potential problem of circular continuity of the inverse Fourier Transform technique and allows for relatively precise control over the frequency response of the filter. Another advantageous aspect is that this implementation allows for simple removal of the transient response of the filter by suitable truncation of the period jitter (PJ) signal in the time domain. A disadvantage of this technique is that it can result in relatively very long filters on the order of thousands of taps, which in turn can use relatively long data records in order to avoid transients.

Each of the two methods described in connection with FIGS. 15 and 16 has advantages and disadvantages. The disadvantages of the FT or FFT method described in connection with FIG. 16 relates to the finite signal lengths, and the fact that the tones are not generally circularly continuous. Because of this, there is significant leakage from each of the tones. This is partially, but not fully, accounted for by removing a finite bandwidth from the spectrum around each tone. In addition, the frequency domain filtering results in a significant transient at the beginning and end of each recovered tone. The advantage of this method is that it is computationally simple and robust.

The main advantage of the Least-Squares method described in connection with FIG. 15 is that there is no transient due to filtering. It is also applicable to non-contiguously sampled signals. The disadvantage is that it is a computationally expensive.

Data Dependent Random Jitter (DDRJ) Separator 728

In the illustrated embodiment, the DDRJ separator 728 takes as input the bit series output from the bit detector 722 (path not shown for clarity in FIG. 7) and the multiple RJ/BUJ TEE series from the periodic jitter (PJ) separator 726. The DDRJ separator 728 employs the N-tuple theory described earlier in connection with the data dependent jitter (DDJ) separator 724 of FIG. 13. For each edge, there is now a defined "N-tuple Identifier" (NI) of the N bits surrounding it, where the N bits are made up of the concatenation of the X-bit binary word leading up to it, and the Y-bit binary word following it (N=X+Y).

The jitter values for the edges with a common NI are grouped together, such that each NI forms its own TIE ensemble. By computing $RJ_{RMS}$ for each of these individual TIE datasets, an accurate calculation of effective $RJ_{RMS}$, and $TJ_{pp}$ can be computed. This computation is described in further detail later in connection with Random Jitter (RJ) 304 Computation.

Transmission Channel Estimator 712

Figure 18:
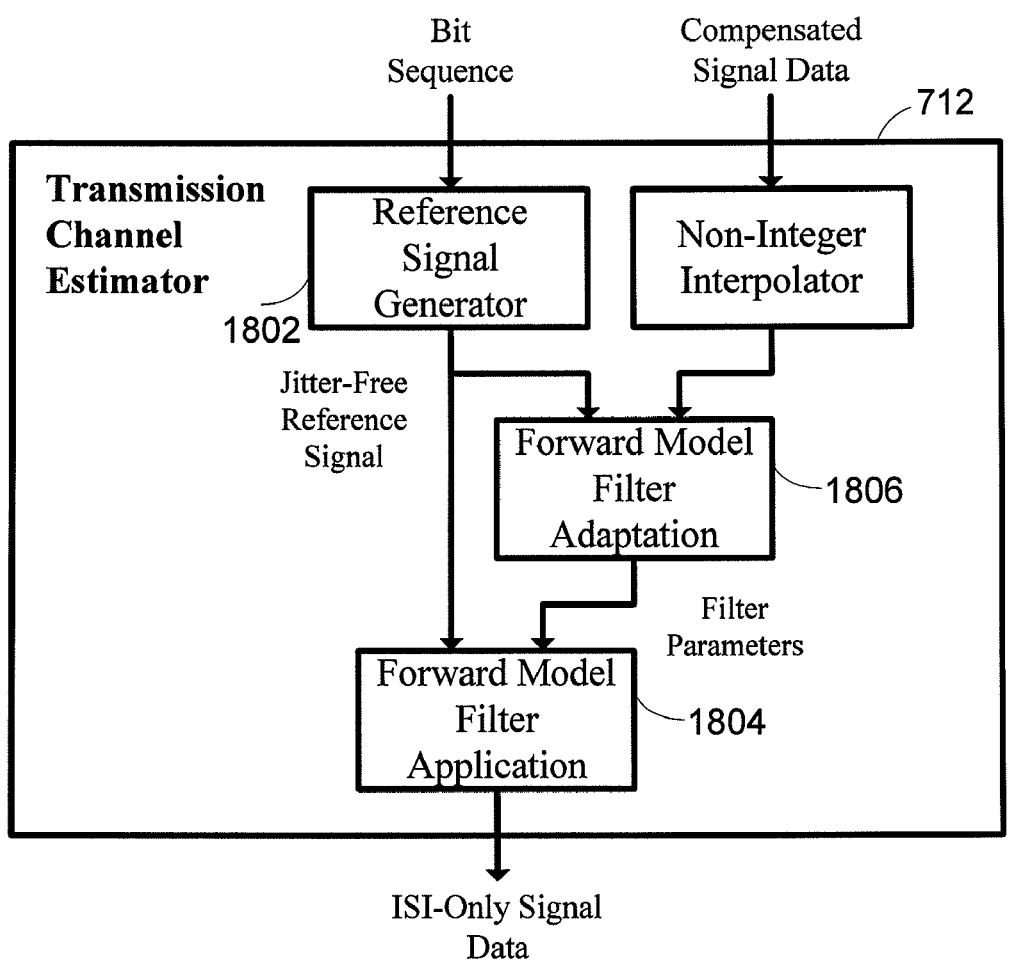
FIG. 18 illustrates one embodiment of a transmission channel estimator.

FIG. 18 illustrates one embodiment of a transmission channel estimator 712. The reconstructed signal data from the signal compensator and the observed bit sequence from the bit detector 722 are provided as inputs to the transmission channel estimator 712. For clarity, the data path from the bit detector 722 to the transmission channel estimator 712 is not shown in FIG. 7. It will be understood that where the data corresponds to multilevel signaling, the bit sequence can correspond to a data sequence. In the illustrated embodiment, a discrete-time linear time invariant filter is used to model the intersymbol interference (ISI) distortion in the acquired signal caused by the transmission channel. It will be understood by the skilled practitioner that with respect to the transmission channel and the transmission channel estimator, the inter-symbol interference (ISI) refers to the interference itself, as opposed to the jitter caused by the interference. Here, the transmission channel refers to any distortion medium that causes inter-symbol interference (ISI). Typical sources of inter-symbol interference (IS) include: linear distortion mechanisms inside the chip, filtering from cables board traces, impedance mismatches from connectors, and the like. There are two components of this block: a reference signal generator 1802 and a forward model discrete-time filter or forward model filter application 1804.

The reference signal generator 1802 is used to generate the reference signal that is used for adapting 1806 the forward model discrete-time filter 1804. The reference signal can be generated from the transmitted bits. If there are no bit errors in the captured signal, then the transmitted bits can be recovered from the captured signal. However, if the captured signal is likely to have bit errors, then the transmitted bits should be entered by, for example, a user copying source data to the reference signal generator 1802.

The jitter-free signal is generated by repeating each bit of the sequence by K times where $$K = \left\lceil \frac{F_s}{F_b} \right\rceil \qquad \text{Equation 11}$$

In Equation 11, $F_s$ is the sampling rate of the compensated signal data, $F_b$ is the bit rate, and $\lceil \cdot \rceil$ denotes rounding towards infinity. The compensated signal data should be resampled to have the same sampling rate as the sampling rate of the repeated bit sequence (i.e. $KF_b$). The resampling can be performed using any non-integer interpolation method. Integer interpolation methods do not work for the typical case where K is not an integer. Non-integer interpolation methods work for all cases.

The forward model discrete-time filter 1804 is used to model the linear distortion that causes the inter-symbol interference (ISI). For general information on forward model discrete-time filter generation, see, for example, Haykin, Simon, *Adaptive Filter Theory*, Prentice Hall, (4th Ed. 2001). After the discrete-time filter 1804 is properly trained, the discrete-time filter 1804 is applied on the reference signal to generate a new waveform signal that contains only the inter-symbol interference (ISI) distortion. By performing jitter analysis on this filter output signal, statistics on the jitter induced by inter-symbol interference (ISI) can advantageously be obtained. There are two components in the design of the forward model discrete-time filter: the structure of the discrete-time filter 1804 and the filter adaptation algorithm 1806.

The illustrated embodiment uses a finite length impulse response (FIR) filter as the filter structure. It will be understood by one of ordinary skill in the art that other filter types can be used, such as infinite length impulse response (IIR) filters, or alternate structures such as a lattice filter. For the adaptation algorithm, the current implementation uses pseudo-inverse to adapt the filter taps of the FIR filter in a least-squares sense. In addition, in another embodiment, use of other adaptation algorithms, such as least mean squares (LMS), or recursive least squares (RLS) are also possible. These can be implemented in such a way as to compensate for time-varying channels.

Device State Dependent Jitter Separator (DSDJ) 730

Figure 19:
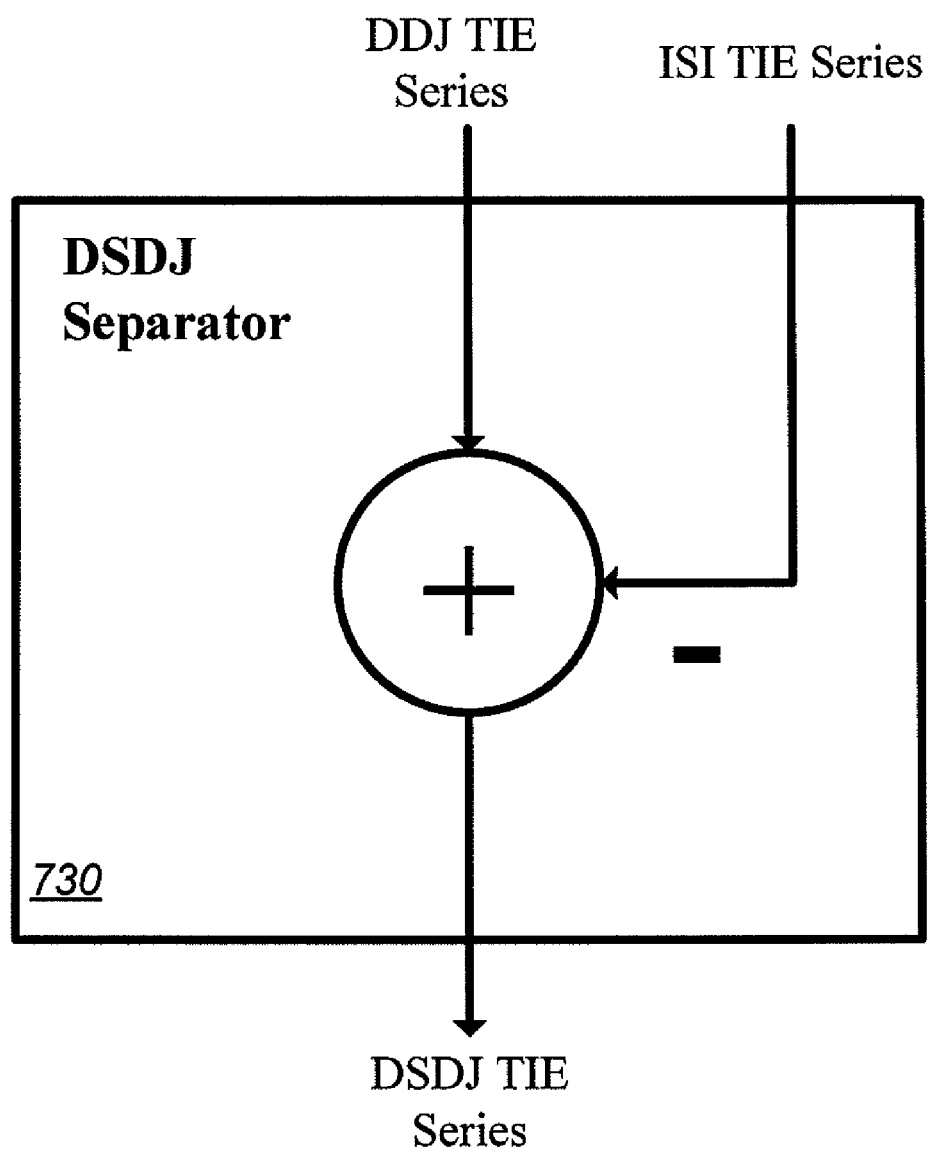
FIG. 19 illustrates one embodiment of a device state dependent jitter (DSDJ) separator.

As illustrated in FIG. 19, the data-dependent jitter (DDJ) TIE from the data-dependent jitter (DDJ) separator 724 illustrated in FIGS. 7 and 13 and the inter-symbol interference (ISI) TEE from the second TIE filter 721 are provided as inputs to the device state dependent jitter (DSDJ) Separator 730. The data-dependent jitter (DDJ) TIE represents data-correlated jitter in the observed signal. The inter-symbol interference (ISI) TIE represents the jitter caused by linear distortions in the system. The inter-symbol interference (ISI) TEE is subtracted from the data-dependent jitter (DDJ) TEE to generate the DSDJ TIE signal. In the illustrated embodiment, the inter-symbol interference (ISI) TIE is filtered by a second TIE filter 721. An example of a filter that can be used for the second TIE filter 721 was described earlier in connection with FIG. 11. The DSDJ TIE represents the jitter caused by non-linearities in the system. The dominant non-linearities tend to be caused by the state of the device, for example, by power supply fluctuations due to device activity. Jitter induced by these types of non-linearities may be correlated or uncorrelated to the data of the signal under test. Jitter that is correlated to the data is classified herein as DSDJ. Jitter that is uncorrelated to the data is classified as bounded uncorrelated jitter (BUJ).

Jitter Statistics Computation 732

Figure 20:
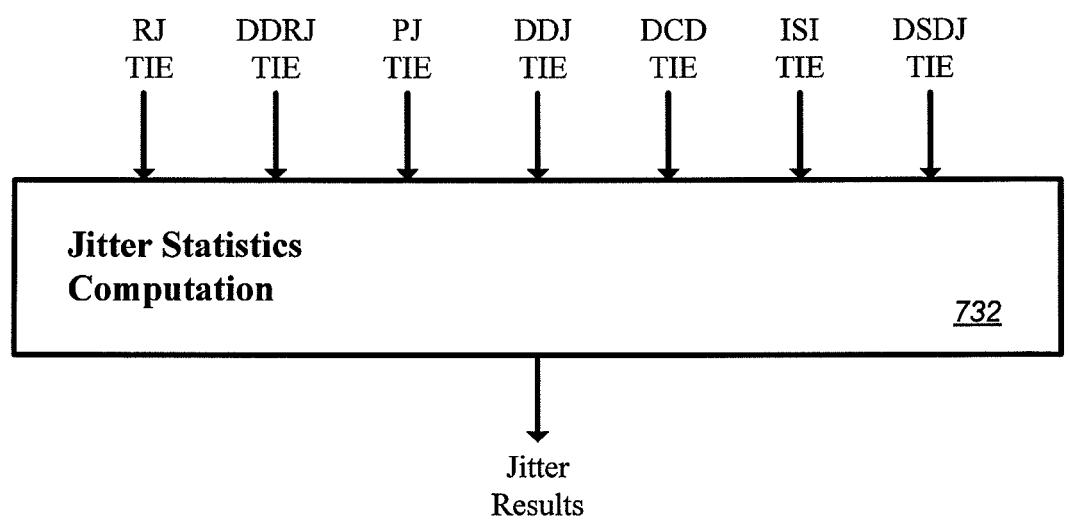
FIG. 20 is a block diagram that illustrates the data flow for jitter statistics computation.

FIG. 20 illustrates a data flow for Jitter Statistics Computation 732. The individual TIE signals that have been decomposed are provided as an input to the Jitter Statistics Computation 732, and the Jitter Statistics Computation 732 calculates the resulting jitter component values as described in further detail below.

Bounded Uncorrelated Jitter (BUJ) 312 Computation

The presence of bounded uncorrelated jitter (BUJ) 312 poses a problem for conventional separation algorithms. Bounded uncorrelated jitter (BUJ) 312 is relatively broadband and is relatively difficult to distinguish from the noise floor in the jitter power spectrum. bounded uncorrelated jitter (BUJ) 312 tends to exhibit a Gaussian-like distribution in the jitter time-domain, with a distinction that it is bounded. This also makes it difficult to distinguish bounded uncorrelated jitter (BUJ) 312 from random jitter (RJ) 304 in the jitter time-domain; however, this distinction between the two types of jitter can be important in system analysis to avoid artificially inflating jitter calculations.

One embodiment allows for the identification of large quantities of bounded uncorrelated jitter (BUJ) 312, by testing whether or not the distribution of the RJ/BUJ TIE is significantly Gaussian (with the assumption that a greater bounded uncorrelated jitter (BUJ) 312 content will result in a less Gaussian distribution). If the bounded uncorrelated jitter (BUJ) 312 content is insignificant, then it will have relatively minimal impact on the results and can be ignored. However, if the dominant source of bounded uncorrelated jitter (BUJ) is known and can be controlled, then there is an experimental approach that can be used to quantify the bounded uncorrelated jitter (BUJ) 312 content through comparative measurements.

A first measurement is performed with the bounded uncorrelated jitter (BUJ) 312 source present. A second measurement is performed with the bounded uncorrelated jitter (BUJ) 312 source shut-off, or minimized. The difference between the RJ/BUJ values for the two measurements can indicate the quantity of bounded uncorrelated jitter (BUJ) 312 present. An example of this is where multiple asynchronous cross-talk aggressors cause large amounts of bounded uncorrelated jitter (BUJ) 312. If the aggressor links can be shut-off, a low-bounded uncorrelated jitter (BUJ) 312 measurement can be performed on the link of interest.

An alternative method, which is also qualitative in nature, is to use the recovered voltage waveform data directly. One example of such a procedure is as follows:

1) Recover the bit sequence.
2) Generate a reference signal, a forward model, and a linear-inter-symbol interference (ISI)-only signal as described in earlier in connection with FIG. 18.
3) Compute the residual error signal (in volts) as the difference between the inter-symbol interference (ISI)-only signal and the received waveform. This error signal is composed of additive noise, non-linear errors, a residual linear error, the timing error mismatch, and cross-talk.

Since the cross-talk is due to another data link operating within the system, the cross-talk can be readily identified by converting the residual error signal to the frequency domain. The cross-talk signal will typically exhibit a spur at the symbol rate of the cross-talk interference.

Random Jitter (RJ) 304 Computation

Many specifications require that a peak-to-peak range of random jitter (RJ) should be determined, outside of which there is a some specified probability of occurrence, termed "critical value." For illustrative purposes, the following uses a critical value of $10^{-12}$, however it will be understood by one of ordinary skill in the art that the principles and advantages described herein will be applicable to other values for the critical value. With existing methods, where random jitter (RJ) is represented by a single Gaussian distribution, the peak-to-peak range is expressed by Equation 12.

$$RJ_{pp}(10^{-12})=14RJ_{rms} \qquad \text{Equation 12}$$

In Equation 12, $RJ_{RMS}=\sigma$, the standard deviation of the random jitter (RJ) distribution.

In the case of a single Gaussian distribution, 14a corresponds roughly to the $10^{-12}$ critical value. When there is data-dependent RJ (DDRJ) present in the signal, the total random jitter (RJ) distribution can include the sum of many different distributions. Given data like this, which includes two or more separate Gaussians, each with zero mean and different standard deviations, the critical value cannot adequately be "looked up." Similarly, there is no conventional straightforward way to combine the two standard deviations to deliver the correct critical value.

An effective standard deviation $\sigma_{eff}$ corresponds to the standard deviation of the random jitter (RJ) TIE series.

The following procedure can advantageously be used to determine the critical value of a mixture of i distributions, each with standard deviation $\sigma_i$. While the procedure is illustrated in the context of zero mean data, the skilled practitioner will appreciate that the principles and advantages can be extended to the case where the means are non-zero.

An Illustrative Procedure for Random Jitter (RJ) Calculation

1. Perform a Kolmogorov-Smirnov test to determine if the ensemble is Gaussian within some level of significance. If it is, then use $RJ(10^{-12})=14\sigma_{eff}$ and stop. Otherwise:
2. Perform a Kolmogorov-Smirnov test on each data-dependent RJ (DDRJ) distribution to determine if it is Gaussian. If any of the data-dependent RJ distributions are not Gaussian, then there may be significant bounded uncorrelated jitter (BUJ) content, and this procedure should not be used.
3. Each data-dependent RJ (DDRJ) distribution will typically be compared with all of the other data-dependent RJ DDRJ distributions. Perform a Kolmogorov-Smirnov test between each pair of distributions to determine which distributions have significantly different standard deviations. Pool the pairs that have approximately the same standard deviation, and then continue.
4. Initialize $RJ_{pp}=RJ(10^{-12})$ to be $14\sigma_{eff}$
5. Compute the probability value d-value) for each of the i distributions at $RJ_{pp}$ $$p_i = \frac{1}{2} - \frac{1}{2}\text{erf}\left(\frac{-\sqrt{2}\,RJ_{pp}}{4\sigma_i}\right) \qquad \text{Equation 13}$$

6. Compute the actual p-value $$p_{act} = \frac{\sum_i N_i p_i}{\sum_i N_i} \qquad \text{Equation 14}$$

7. If $p_{act}>10^{-12}$
   $RJ_{PP}=RJ_{PP}+\mu$ ($\mu$ is a relatively small step size
   $p_{act\_old}=p_{act}$ go to 5
   Else continue
8. Output $RJ(p_{act\_old})=RJ_{pp}$ The foregoing represents a 1-D line search minimization of the function expressed in Equation 15. In one example, $\mu$ corresponds to a relatively small step size, such as, for example, about 1% to about 5% of the initialized value for $RJ_{pp}$. Other values for $\mu$ will be readily determined by one of ordinary skill in the art.

$$e=|p_{act}-p_{desired}|^2 \qquad \text{Equation 15}$$

The function expressed in Equation 15 is convex and quadratic near the solution. Virtually any line search algorithm- can advantageously be used to find the minimum to a desired degree of accuracy, and it will be understood by one of ordinary skill in the art that the procedure outlined above is only representative of one embodiment. This algorithm can also be used to generate the "bathtub curve" for a variety of different p values.

Deterministic Jitter Computations

In the illustrated embodiment, the deterministic jitter computations are reported as peak-to-peak values based on the recovered TEE signals.

The duty cycle distortion (DCD) in the signal is related to the mean difference in edge crossing times between falling edges and rising edges. This correlates with data-dependent jitter (DDJ) calculation for N=2, where the mean edge crossing times are calculated for two NI's: NI=01 and NI=10 (NI=00 and NI=11 can be ignored because there is no edge crossing).

In the equations of Table 2, variables denoted as 'TIE' represent the complete time series over the duration of the captured waveform for the jitter subcomponent of interest.

TABLE 2

Jitter Equations

| Equation Description | Equation | Equation # |
|---|---|---|
| Peak-to-peak periodic jitter | $PJ_{pp} = \max(PJ_{TIE}) - \min(PJ_{TIE})$ | Equation 16 |
| Peak-to-peak data dependent jitter | $DDJ_{pp} = \max(DDJ_{N,TIE}) - \min(DDJ_{N,TIE})$ | Equation 17 |
| Peak-to-peak duty cycle distortion jitter | $DCD_{pp} = \max(DDJ_{2,TIE}) - \min(DDJ_{2,TIE})$ | Equation 18 |
| Peak-to-peak linear inter-symbol interference jitter | $ISI_{pp} = \max(ISI_{TIE}) - \min(ISI_{TIE})$ | Equation 19 |
| Peak-to-peak device-state dependent jitter | $DSDJ_{pp} = \max(DSDJ_{TIE}) - \min(DSDJ_{TIE})$ | Equation 20 |
| Peak-to-peak deterministic jitter | $DJ_{pp} = DDJ_{pp} + PJ_{pp}$ | Equation 21 |
| Peak-to-peak total jitter | $TJ_{pp} = DJ_{pp} + RJ_{pp}$ | Equation 22 |

It should be noted that the expression for peak-to-peak total jitter ($TJ_{pp}$) in Equation 22 corresponds to an approximation that is commonly used in industry specifications. A statistically correct calculation includes the convolution of the random jitter (RJ) TIE distribution and the deterministic jitter (DJ) TIE distribution, from which the $TJ_{pp}$ for the desired population can be derived. In one embodiment, these distributions correspond to TEE time series as illustrated in the foregoing.

Example Applications

Embodiments can advantageously be applied where measurement of the modulation of transitions between defined states in a digital communications system is desired. For example, this can apply to the phase modulation of transitions between digital voltage levels, or jitter, as described above. It can also be applied to the measurement of phase modulation in multilevel signaling. In addition, variations of embodiments can be expanded to include amplitude and frequency modulations, which are used in many types of signaling.

Conventional jitter analysis and decomposition solutions do not satisfactorily meet the needs of existing and emerging telecommunication standards. The proposed method can advantageously be widely implemented as a test solution to meet the requirements of such international specifications as: Fibre Channel; Gigabit Ethernet; XAUI; SONET/SDH; Infiniband; and the like. Embodiments can also be used for emerging standards, such as: multilevel signaling; SATA; upcoming higher speed interfaces (5 Gb/s and beyond); and the like.

Example of Application to Signal Analysis in Multilevel Signaling

In comparison to binary signaling, multilevel signaling expands the number of possible level states from $2^1$ to $2^N$, where N is the number of bits per symbol. The transition between each of the states can also be subjected to jitter in the same manner as binary signaling. With a few modifications to the embodiment described earlier in connection with FIG. 9, the principles and advantages of the techniques used to analyze jitter in binary signaling can be directly applied to jitter analysis in multilevel signals.

In multilevel signaling, a voltage difference between states can be expressed as shown in Equation 23.

$$\delta V = \frac{V_{pp}}{2^N - 1} \qquad \text{Equation 23}$$

In Equation 23, $V_{pp}$ is the maximum peak-to-peak voltage swing. This decrease in the voltage separation between levels increases the sensitivity to additive voltage noise and gain error. The voltage error can be decomposed in the same way as the timing error. The decomposition procedure described herein can be used for this purpose.

Application to Jitter Specifications in Emerging Communications Standards

Given the rate of advancement of digital communication technologies, new signaling standards are constantly emerging. While the standards will change, the need to measure and analyze the jitter content of the signals remains. The techniques described herein may advantageously be applied to decompose and analyze the jitter content according various qualities such as: data sequence correlation, time domain distribution, and frequency content. This versatility allows for compliance measurements for a variety of existing and emerging standards.

Application to an Integrated Circuit Embodiment

While the illustrated embodiment was implemented in software, embodiments can also be implemented using hardware, such as application-specific hardware, or by a combination of software and hardware. For example, an embedded jitter test can be implemented within an integrated circuit. With the construction of a sampling mechanism inside the transmitter or receiver of a device, the sampled data can be passed through to an on-chip processor. The jitter content inherent in the signals of interest can be measured to enact a self-test, or even self-analysis, of device jitter generation, jitter tolerance, or jitter transfer.

In one embodiment, a combination of hardware, firmware and software implemented on a combination of microprocessors, digital signal processors, field-programmable gate arrays (FPGAs), and/or application specific integrated circuits (ASICs). Embodiments can be directed to a dedicated implementation for a particular device's verification, or for a more general-purpose implementation.

Example Embodiment

Figure 21:
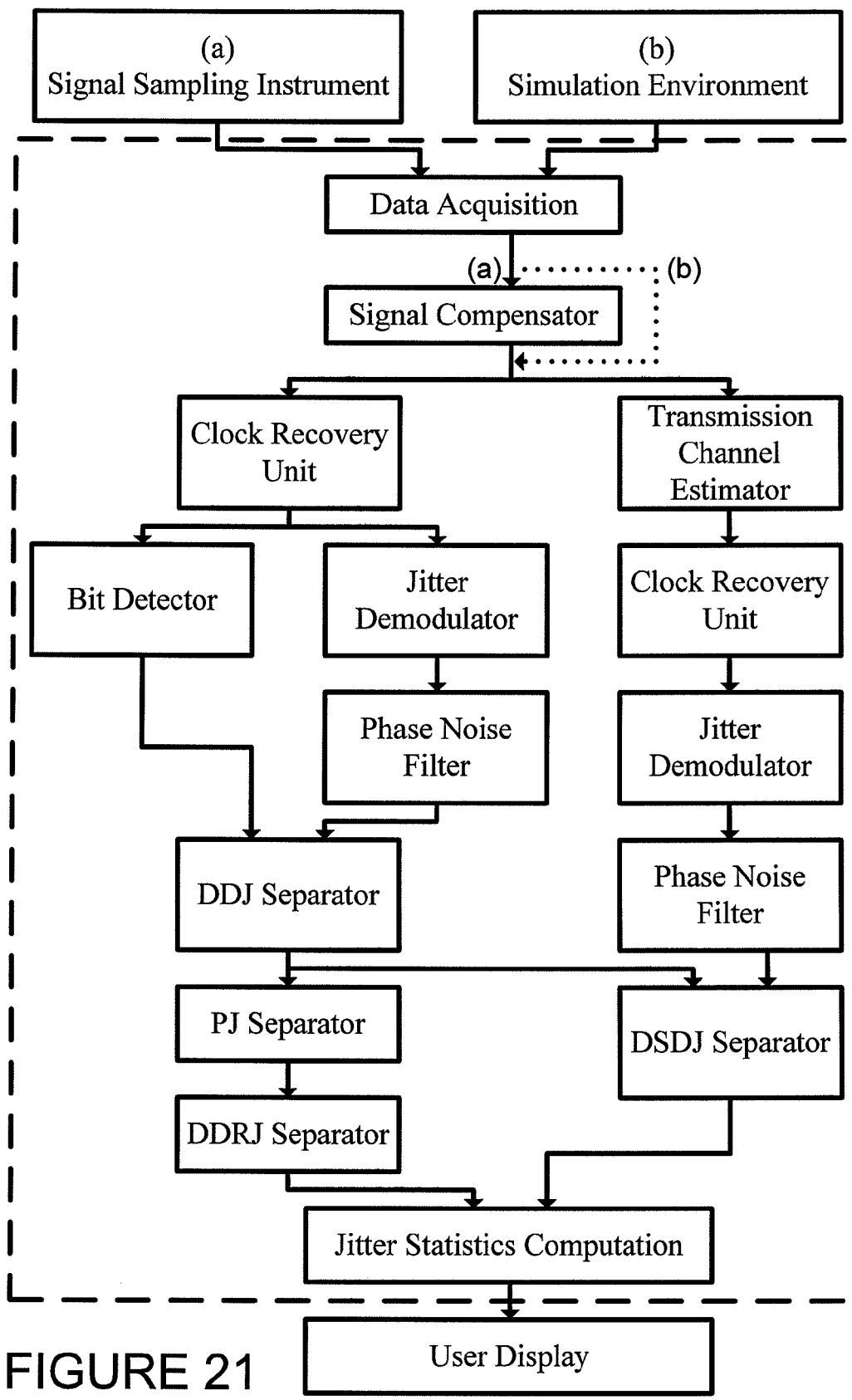
FIG. 21 illustrates an embodiment of a method of jitter analysis for digital communication signals of arbitrary data sequences.

FIG. 21 illustrates an embodiment of a method of jitter analysis for digital communication signals that can advantageously correspond to arbitrary data sequences. The method can be performed in a software system, where input can be passed in from one of two sources, and the output results are provided through a user interface. The input can be generated from laboratory measurements or from simulation. In the case of laboratory measurements, an oversampling oscilloscope can be used to capture the signal of interest. The sample rate of the oscilloscope should be at least four times the bit rate in order to get enough samples on each edge for the interpolation of the threshold crossings. The signal data is passed into the software environment and processed by the analysis system. Results can be provided as output in the form of one or more of: values for the individual jitter components, as well as graphs of the various data and TEE signal, time and frequency domain representations. Applications of this embodiment include, but are not limited to: analysis of device jitter generation, analysis of device jitter transfer, and analysis of device jitter tolerance.

Various embodiments of the present invention have been described in this document. Although this invention has been described with reference to these specific embodiments, the descriptions are intended to be illustrative of the invention and are not intended to be limiting. Various modifications and applications may occur to those familiar with the subject without departing from the true spirit and scope of the invention. Many of the inventive methods and features described in this document may be used independently of each other, and by describing them together as part of a common embodiment, no implication is made that these methods and features need to be used in combination.

What is claimed is:

1. A method of analyzing jitter in an observed data signal, where the jitter includes inter-symbol interference (ISI) from linear distortion, the method comprising:
   receiving a data sequence corresponding to the observed data signal;
   generating a reference data signal from the data sequence;
   receiving the observed data signal;
   non-linearly interpolating the observed data signal so that a sampling rate for the non-linearly interpolated observed data signal and a sampling rate for the reference signal match;
   comparing the reference data signal to the non-linearly interpolated observed data signal to generate a model of the linear distortion, where the model includes filter coefficients;
   providing the filter coefficients of the model to a digital filter; and
   processing the reference data signal using the filter coefficients of the model to generate a data signal with inter-symbol interference (ISI) jitter.

2. The method as defined in claim 1, wherein the generated data signal with inter-symbol interference (ISI) jitter has substantially no other forms of jitter.

3. The method as defined in claim 1, wherein receiving the data sequence further comprises extracting the data sequence from the observed data signal.

4. The method as defined in claim 1, wherein receiving the data sequence further comprises retrieving the data sequence from an uncorrupted source for the observed data sequence.

5. The method as defined in claim 1, further comprising:
   receiving a data-dependent jitter (DDJ) TIE series corresponding to the observed data signal; and
   subtracting the generated data signal with inter-symbol interference (ISI) from corresponding samples of the DDJ TEE series to compute device state dependent jitter (DSDJ).

6. The method as defined in claim 1, further comprising:
   subtracting the generated data signal with inter-symbol interference (ISI) from corresponding samples of the observed data signal to generate a residual error waveform;

computing a Fourier Transform of the residual error waveform to convert to frequency domain; and identifying at least one signal impairment by identifying a spur in the frequency domain representation of the residual error waveform.

7. The method as defined in claim 6, wherein the Fourier Transform is computed using the Fast Fourier Transform.

8. The method as defined in claim 6, further comprising relating a frequency of the spur to a symbol rate of a source for cross-talk interference.

9. The method as defined in claim 1, further comprising using the model of the linear distortion to estimate an amount of linear inter-symbol interference (ISI) jitter in a total jitter (TJ).

* * * * *